United States Patent [19]

Bier

[11] Patent Number: 6,072,501

[45] Date of Patent: ***Jun. 6, 2000

[54] METHOD AND APPARATUS FOR COMPOSING LAYERED SYNTHETIC GRAPHICS FILTERS

[75] Inventor: Eric A. Bier, Mountain View, Calif.

[73] Assignee: Xerox Corporation, Stamford, Conn.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/883,845

[22] Filed: Jun. 27, 1997

[51] Int. Cl.⁷ .................................................. G06T 11/60
[52] U.S. Cl. .............................. 345/433; 345/435
[58] Field of Search .................... 345/433, 441, 345/434, 435

[56] References Cited

U.S. PATENT DOCUMENTS

| | | | |
|---|---|---|---|
| 5,133,052 | 7/1992 | Bier et al. ................................. | 345/455 |
| 5,283,560 | 2/1994 | Bartlett ..................................... | 345/114 |
| 5,341,466 | 8/1994 | Perlin et al. ............................. | 395/139 |
| 5,357,603 | 10/1994 | Parker ...................................... | 345/441 |
| 5,425,137 | 6/1995 | Mohan et al. ........................... | 345/433 |
| 5,467,441 | 11/1995 | Stone et al. .............................. | 395/133 |
| 5,479,603 | 12/1995 | Stone et al. .............................. | 395/161 |
| 5,596,690 | 1/1997 | Stone et al. .............................. | 395/133 |
| 5,689,287 | 11/1997 | Mackinlay et al. ..................... | 345/433 |

OTHER PUBLICATIONS

"CorelDRAW User's Manual—vol. 1—Version 5.0," Corel Corporation, 1994, pp. 274–279.

Bier, Eric A. and Maureen Stone. Snap–dragging. Proceedings of SIGGRAPH '86 (Dallas, Aug.), Computer Graphics, vol. 20, No. 4, ACM, 1986, pp. 233–240.

Bier, Eric A., Maureen C. Stone, Ken Fishkin, William Buxton, and Thomas Baudel. A Taxonomy of See–Through Tools. Proceedings of CHI '94, (Boston, MA, Apr. 24–28) ACM, New York, (1994), pp. 358–364.

Bier, Eric A., Maureen C. Stone, Ken Pier, William Buxton, and Tony D. DeRose. Toolglass and Magic Lenses: The See–Through Interface. Proceedings of SIGGRAPH '93 (Anaheim, CA, Aug.), Computer Graphics Annual Conference Series, ACM, 1993, pp. 73–80.

Gangnet, Michel, Jean–Claude Herve, Thierry Pudet, and Jean–Manuel Van Thong. Incremental Computation of Planar Maps. Proceedings of SIGGRAPH '89 (Boston, MA, Aug.). Computer Graphics, vol. 23, No. 3, pp. 345–354.

(List continued on next page.)

*Primary Examiner*—Mark K. Zimmerman
*Assistant Examiner*—Albert K. Lee

[57] ABSTRACT

A computerized two-dimensional illustration system composes an image of a scene with layered synthetic graphics filters or lenses. The scene is defined by an ordered list of shapes. Some of the shapes in the ordered list of shapes are lenses. Each lens is a shape that has a fill color which is an operator rather than a constant. The operator of a selected lens performs a filtering function on the shapes ordered below it in the list of shapes. To compose a selected lens in the scene, the system first computes an under-list of shapes for the selected lens. The under-list of shapes is used to identify those shapes in the ordered list of shapes to which the filtering function of the selected lens may apply. Depending on the filtering function of a lens, the lens composes in either a back-to-front order or a front-to-back order. A lens composes in a back-to-front order by freezing lenses in the under-list before applying the filtering function of the lens to shapes in the under-list. In contrast, a lens composes in a front-to-back order by applying the filtering function of the lens to the under-list of shapes before freezing lenses in the under-list. When a lens is frozen, it is replaced with a cluster of shapes that are formed independently of other shapes in the list of shapes.

21 Claims, 24 Drawing Sheets

OTHER PUBLICATIONS

Pier, Ken, Eric Bier, and Maureen Stone. An Introduction to Gargoyle: An Interactive Illustration Tool. In J.C. Van Vliet (ed.), Document Manipulation and Typography, Proceedings of the International Conference on Electronic Publishing, Document Manipulation and Typography (Nice, France, Apr.). Cambridge University Press, 1988, pp. 223–238.

Stone, Maureen,, Ken Fishkin, and Eric A. Bier. The Movable Filter as a User Interface Tool. Proceedings of CHI '94, (Boston, MA, Apr. 24–28) ACM, New York, (1994), pp. 306–312.

FIG. 18
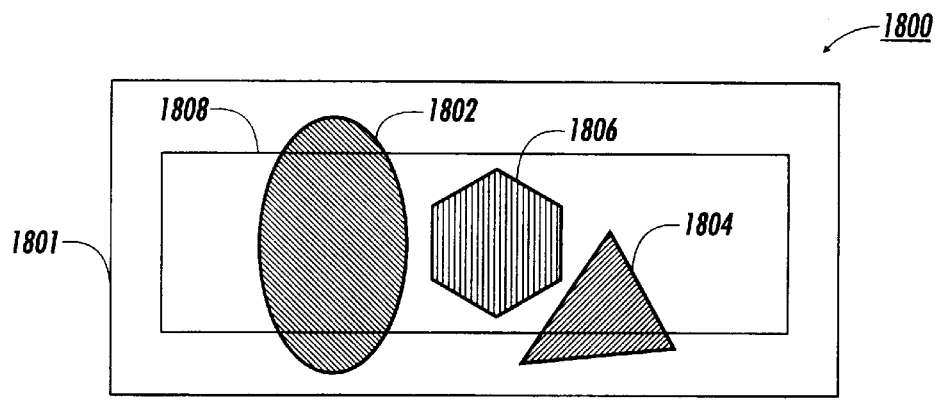
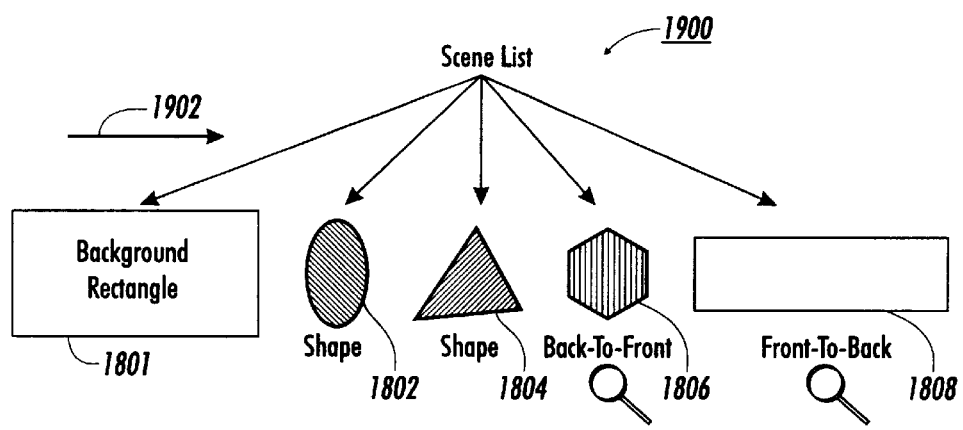
FIG. 19
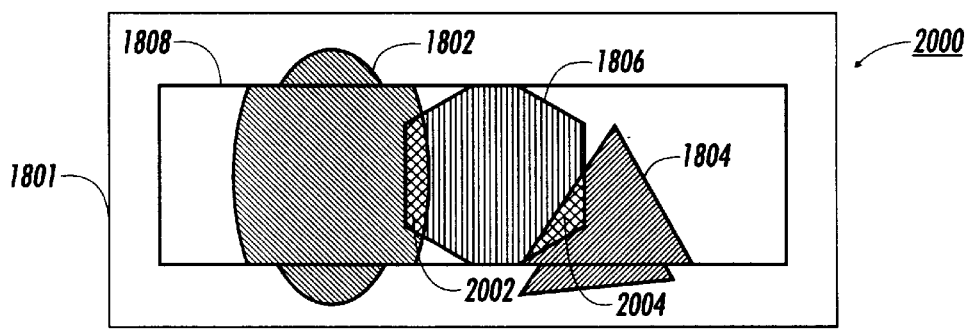
FIG. 20

FIG. 21
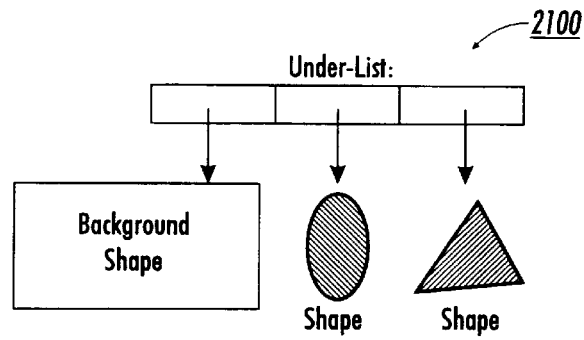
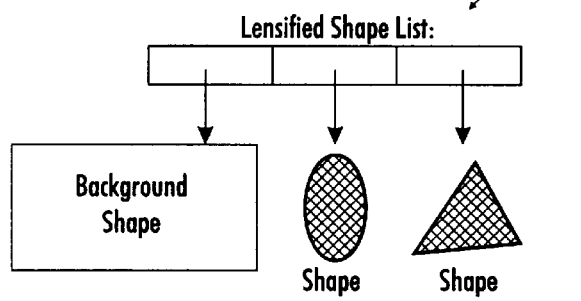
FIG. 22
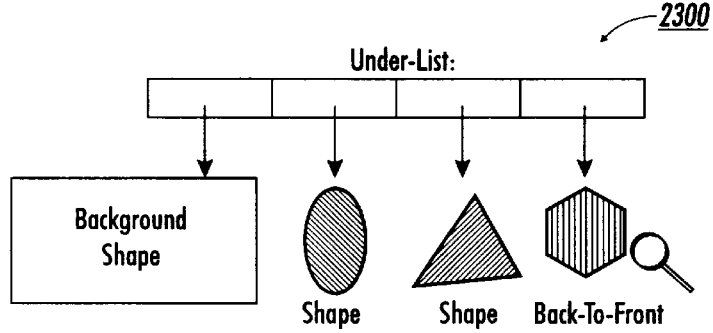
FIG. 23

METHOD AND APPARATUS FOR COMPOSING LAYERED SYNTHETIC GRAPHICS FILTERS

CROSS-REFERENCE TO RELATED APPLICATION

Cross-reference is made to U.S. patent application Ser. No. 08/883,794, entitled "Method And Apparatus For Defining The Scope Of Operation Of Layered Synthetic Graphics Filters", which is assigned to Xerox Corporation.

BACKGROUND OF THE INVENTION

1. Field of the Invention

The present invention relates generally to a method and apparatus for forming an image with a computer illustration system, and more particularly, to a method and apparatus for composing an image with layered synthetic graphics filters that overlap other objects in a scene.

2. Description of Related Art

Generally, computerized two-dimensional illustration systems provide designers with tools for constructing a design by layering graphical objects while specifying their properties. Examples of commercial computerized two-dimensional illustration systems are CorelDraw™ by the Corel Corporation, FreeHand™ by the MacroMedia Corporation, and Adobe Illustrator® by the Adobe Corporation. In such illustration systems, the properties of a graphical object may vary depending on the particular graphical object being developed. For example, bounded geometrical shapes are graphical objects with properties that include line width, fill color, and transparency whereas line segments are graphical objects with properties that include line width and line color.

A characteristic of illustration systems is that they tie the properties of each graphical object closely to the manner in which each object is constructed. This close tie makes the creation of complex visual effects using these illustration systems difficult. The following examples illustrate the close tie between a graphical object's construction and its properties. First, filled regions must be explicitly constructed and closed. Second, line and fill properties must be applied to complete outlines or complete line segments. Finally, transformations can only be applied to complete objects or groups of objects. This property of illustration systems is cumbersome for designers to create visual effects that appear to cross object boundaries. In order to create a visual effect that appears to cross object boundaries, a designer typically must introduce extra shapes and boundaries into a design. As a result, designers that operate these systems are limited because they must create object boundaries that define the extent of any visual effect.

Spatially bounded synthetic graphics (hereinafter "SG") filters or lenses enable a designer to define a graphical object with line or vector graphical properties that change depending on the particular objects in the scene in which they are defined. SG filters (or lenses) have been developed in order to minimize the effect of the close tie between the properties of a graphical object and the manner in which the object is constructed. Unlike non-lens graphical objects which have an appearance that does not change once it is defined (i.e., static), bounded lenses change the appearance of objects seen through their interiors. These bounded lenses therefore have an appearance in a scene that is "dynamic." Unlike static graphical objects, dynamic objects have properties that change as objects are added to or taken from the bounded region of the lens. In effect, these spatially bounded lenses enable visual effects to extend across object boundaries which are independent of the boundaries of each of the underlying objects.

Examples of spatially bounded lenses (or SG filters) are disclosed in U.S. Pat. Nos. 5,596,690, 5,467,441, and 5,479,603, which are assigned to the same assignee as the present invention and incorporated herein by reference. Particular reference is made to U.S. Pat. No. 5,479,603 which describes a method for composing overlapping lenses in an original image. The method described in U.S. Pat. No. 5,479,603 composes, or combines, the functions of multiple viewing operations operating on a model data structure to produce a single composite image displayed in the context of an original image. Also, commercial illustration systems such as Adobe Illustrator, MacroMedia FreeHand, and CorelDraw support a rich set of tools for constructing and filling outlines. Specifically, the CorelDraw software contains a number of lenses (or SG filters) which are described in a section entitled "Lens" in CorelDRAW™ User's Manual—Vol. 1—Version 5.0, Corel Corporation, 1994, pp. 274–297.

Related to spatially bounded filters are planar maps, and tools that operate strictly on raster images. Planar maps, which are disclosed by Gangnet et al. in "Incremental Computation Of Planar Maps," Proceedings of SIGGRAPH '89 (Boston, Mass., August), Computer Graphics, Vol. 23, No. 3, pages 345–354, have been used to provide a way to partition existing scene geometry into regions that can be filled. Some of the effects disclosed by Gangnet et al. may appear similar to lenses. The difference between lenses and planar maps is that planar maps make the object partitioning easy. Lenses, however, make object partitioning unnecessary. Furthermore, lenses can also create effects beyond those provided by planar maps by adding and deleting objects, and performing affine transformations. Also, tools that operate strictly on rasters may create lens-like effects on raster objects, however, these raster tools are unable to operate on geometric objects.

The aforementioned systems, however, do not compose objects in a scene that are defined as lenses (or SG filters) in varying orders that depend on a lens type identified for each lens. With each lens having a lens type, an ordered list of objects in a scene can be either composed in a front-to-back or back-to-front order. Such a capability would enable the creation of a wider variety of scenes with respect to each lens. Accordingly, it would be desirable to provide a generic system for efficiently composing lenses (or SG filters), defined as either front-to-back or back-to-front lenses, that overlap with other objects in a scene.

SUMMARY OF THE INVENTION

In accordance with the invention there is provided a method, and a computerized illustration system therefor, for composing objects in an image that are defined as spatially bounded synthetic graphics filters or lenses.

In accordance with one aspect of the invention, a list of shapes in a memory of the computer illustration system is defined. At least one shape in the list of shapes is specified to be a lens with a filtering function that applies to at least one other shape in the list of shapes. Each shape in the list of shapes is formed to compose the image. A selected lens in the list of shapes is formed by performing the steps of: computing an under-list of shapes for the selected lens, the under-list of shapes identifying shapes in the list of shapes to which the filtering function of the selected lens may apply; freezing any shape specified to be a lens in the under-list of shapes by replacing each lens with shapes that are formed independently of other shapes; and applying the filtering function of the selected lens to each shape in the under-list of shapes.

In accordance with another aspect of the invention, a composition order is assigned to each lens specified in a layered list of shapes to be one of a front-to-back ordering and a back-to-front ordering. In the case of a selected lens specified to be a back-to-front ordering, each lens in the under-list of the selected lens is frozen before the filtering function of the selected lens is applied to each shape in the under-list of the lens. In the case of a selected lens specified to be a front-to-back ordering, the filtering function of the selected lens is applied to each shape in the under-list of the selected lens before each lens in the under-list of the selected lens is frozen.

BRIEF DESCRIPTION OF THE DRAWINGS

These and other aspects of the invention will become apparent from the following description read in conjunction with the accompanying drawings wherein the same reference numerals have been applied to like parts and in which:

FIG. 18 illustrates a non-composed scene that includes a background shape and four geometric shapes;

FIG. 19 illustrates a scene list of the shapes in the non-composed scene shown in FIG. 18;

FIG. 20 illustrates a composed scene of the non-composed scene shown in FIG. 18 when the rectangular magnifying lens is composed in front-to-back order;

FIG. 21 illustrates the under-list of the hexagon shaped lens;

FIG. 22 illustrates the lensified shape list of the hexagon shaped lens;

FIG. 23 illustrates the under-list of the rectangular magnifying lens;

DETAILED DESCRIPTION

A. System Overview

Figure 1:
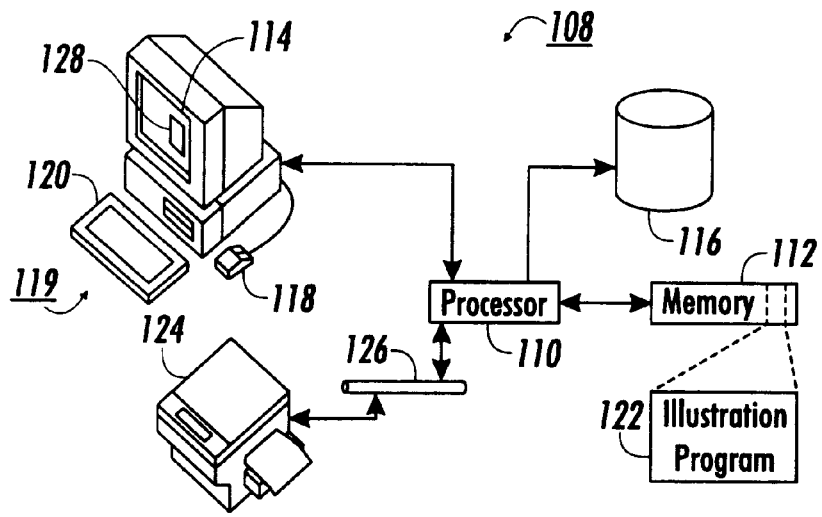
FIG. 1 illustrates a computerized two-dimensional illustration system for carrying out the present invention.

Referring now to the drawings where the showings are for the purpose of describing the invention and not for limiting same, FIG. 1 illustrates a computerized two-dimensional illustration system 108 for carrying out the present invention. The illustration system 108 is a computer workstation or the like which is adapted to store and process electronic images for display to a user (or graphics designer). The illustration system 108 includes a processor 110, a memory 112, a display screen 114, file storage 116, and user input devices 119 such as a mouse 118 and a keyboard 120. Alternate input devices 119 include a touch screen, a track ball, a touch pad, or a pen mouse (not shown). The memory 112 is provided for storing various operating programs and electronic images. One of the illustration system's operating programs is an illustration program 122. Images created using the illustration program 122 are stored in file storage 116 which provides long term storage for electronic illustrations. The display screen 114 is used to display electronic illustrations that are developed by a user with the illustration program 122. The processor 110 receives commands from the input devices 119 to invoke operating software in memory 112 thereby creating and displaying images with illustration program 122 on display screen 114.

Illustration program 122, which is executed by processor 110, is used to develop graphic illustrations which can be viewed on the display screen 114. In addition, printouts of images created using illustration program 122 can be created using scanning/printing system 124 which is coupled to illustration system 108 by network 126. The illustration program 122 facilitates the design of graphic illustrations with an interface tool 128 which is presented to a user on display 114. Once created, these graphic illustrations are stored electronically in file storage 116 for later retrieval. Graphic illustrations can consist of images scanned using the scanning/printing system 124 or descriptions of images generated using user application software stored in memory 112. In general, illustration program 122 provides descriptions of images defining an electronic document using high level primitives defined by a page description language (PDL).

The input devices 119 are used to define image elements which are used to create an electronic illustration. Image elements include geometric shapes, rasters, and characters. Geometric shapes are defined using for example line or vector graphics. Image elements that are defined by a user are manipulated by illustration program 122. The illustration program 122 renders illustrations using a PDL such as Postscript® which is described in "PostScript Language Reference Manual", Second Edition, Addison-Wesley Publishing Co., 1990. Another example of a PDL is Interpress™ which is described in "Interpress: The Source Book", by Harrington et al., Simon & Schuster, Inc., New York, N.Y., 1988. Each of these PDLs provide a set of commands that are used to describe various graphic and textual image elements forming an image. For example, a PDL can describe a rectangle in an image by indicating coordinates of its comers, the thickness of its edges, its fill pattern, its color as well as other attributes. The PDL can also be used to include in the input image a raster image or a reference to one or more raster images.

B. Apparatus For Creating A Scene With Overlapping Lenses

The present invention relates to the composition of lenses (or SG filters) that form part of graphical components of an electronic illustration. The effect of a lens is visible only within the boundary of the object specifying the lens. The effect of a lens can be manipulated independently of the boundaries of the objects seen through the lens. The illustration program 122 which operates in memory 112 of illustration system 108 creates and manipulates image objects.

More particularly, the illustration program 122 is adapted to specify a property of an image object to be a lens. A lens (or SG filter) is defined herein as a color property of an image object with a set of bounded regions whose color lo property is an operator rather than a constant. An operator of a lens (hereinafter "lens operator") performs a filtering operation on those objects layered below it in a scene. It will be understood by those skilled in the art that a lens operator can be any procedure that transforms one set of objects in a scene into another scene. Examples of lens operators are a tinting operator, a magnifying operator, an operator that changes the order in which objects overlap in a scene, and an operator that applies a transform (e.g., an affine transform) to the objects underlying the lens.

Many of the different lenses (or SG filters) require that certain parameters such as color (for tinting lenses) or magnitude (for scaling lenses) are specified by a user. Some lenses require that sets of parameters are specified by a user. For example, property-setting lenses have many parameters that can be set including fill color, stroke color, stroke width, dash pattern, or background color. These are the same sorts of parameters that can be applied to objects defined in a scene which have not been specified as having properties of a lens.

To provide a way to interactively manipulate these parameters of different lenses, the illustration system 108 has a system-wide mode called "EditLens". In this system wide mode, all of the property setting commands in the interface tool 128 are applied to the parameters of a selected lens instead of a selected shape. For completeness, there is a keyword-based text format for specifying lens (or SG filter) parameters. A menu item that writes the current lens description into a typescript makes the keyword-based text format easier to use. Thus, using a menu item simplifies the steps of modifying the description and reading it back in again.

The illustration program 122 creates and manipulates lenses in a similar manner as other graphics objects. The borders of objects specified as lenses have width and color. Furthermore, the objects specified as lenses can lie anywhere in a 2.5 dimensional overlap order of a scene, and can be included in hierarchical groupings called clusters. Users can select whether a lens included in a cluster operates only on other objects in the cluster, only on objects outside of the cluster, or both. Defining scoping rules is useful both for performance reasons and to provide design flexibility.

C. Creating A Scene With Overlapping Lenses

Figure 2:
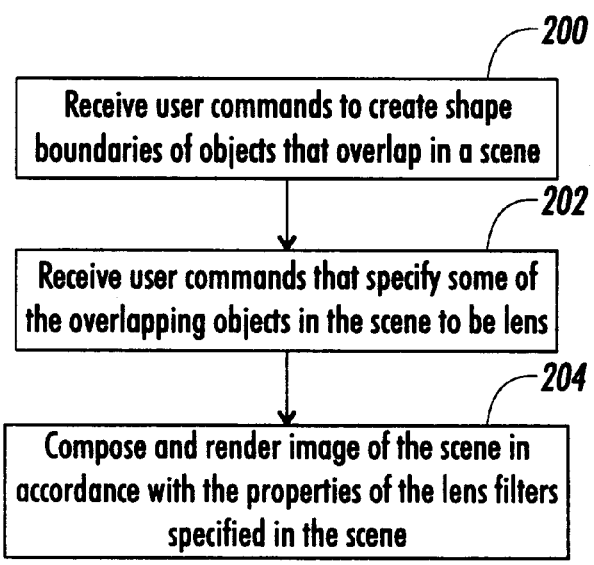
FIG. 2 is a flow diagram which sets forth the steps for operating a user interface tool for creating a scene and specifying that the objects in the scene have the property of a lens.

Illustration program 122 provides a manner in which an object may be specified as having a lens property. FIG. 2 is a flow diagram which sets forth the steps for operating the user interface tool 128 (shown in FIGS. 1 and 26) for creating a scene and specifying that the objects in the scene have the property of a lens (or SG filter). Initially at step 200, the processor 110 of the illustration system 108 receives user commands from input devices 119 that specify shape boundaries of objects. These object are used to create a scene in an illustration. The commands are input to the illustration system 108 through the user interface tool 128 which is presented on display screen 114.

More specifically, user commands received by the illustration system 108 at step 200 include user commands that create overlapping objects. These overlapping objects, which define a scene, are stored in data structures in memory 112. When an image is displayed on display 114 or recorded on a recording medium by printer 124, the illustration program 122 uses the Interpress or Postscript imaging models described above to render the data structures stored in memory 112 to a printable form. These models define commands for specifying objects as shapes that are bounded by lines and spline curves in a device independent manner. In addition, these models define how shapes can be filled with a color or a texture in a device independent manner.

At step 202, additional user commands are received by the illustration system 108 that specify the properties of at least some of the overlapping objects in the scene to be lenses (or SG filters). The step of specifying an object to be a lens includes the act of selecting a lens type from a menu of lens types specified in the user interface tool 128. The menu of lens types include tinting (including those that add shapes), magnifying, transforming, and ordering lens types. Objects specified with user commands at step 202 can be selected and manipulated in a similar manner to other objects displayed on display screen 114. At step 204, the scene of objects specified with user commands at steps 200 and 202 is composed and rendered in accordance with the properties of the objects specified as lenses in the scene. A scene is composed at step 204 once the illustration program 122 detects objects specified as lenses at steps 200 and 202 that are overlapping. A scene is composed in Postscript and rendered for display on screen 114 or on a recording medium using printer 124. Alternatively, scenes that is composed can be recorded in file storage 116 for later retrieval by a user.

Figure 3:
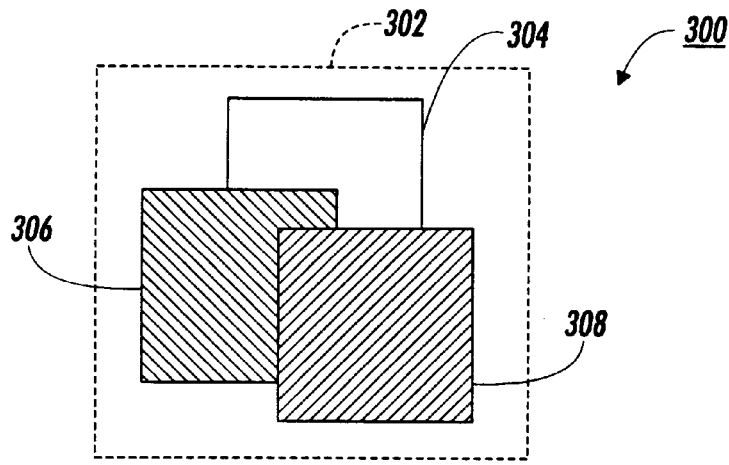
FIG. 3 is an example of a non-composed scene that is created according to the steps outlined in FIG. 2.
Figure 4:
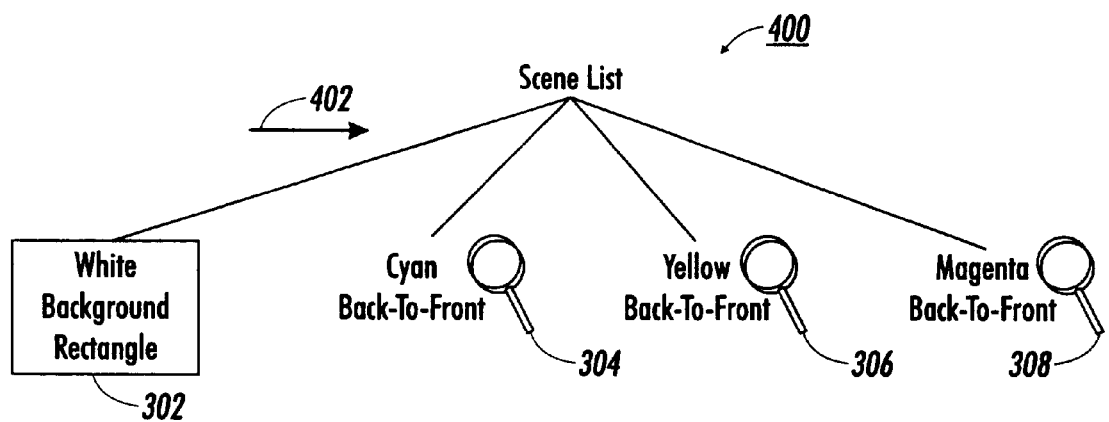
FIG. 4 illustrates a scene list which specifies the order in which the .shapes in a scene overlap.

FIG. 3 is an example of a non-composed scene 300 that is created according to the steps outlined in FIG. 2. At step 200, the non-composed scene 300 is defined using background rectangle 302 and three rectangular shapes 304, 306, and 308. At step 202, the fill color of each rectangular shape 304, 306, and 308 is specified to be a tinting lens with the tinting colors cyan, yellow, and magenta, respectively (where each color is represented in FIG. 3 using different fill patterns). The order in which the shapes overlap is specified by a scene list 400 which is illustrated in FIG. 4. The arrow 402 indicates the order in which the objects in the scene are layered in a back-to-front order. FIG. 4 illustrates each shape that is defined as having the property of a lens with a small magnifying lens.

In selecting a lens property at step 202 in FIG. 2, depending on the type of lens (e.g., tinting, magnifying, etc.) the lens has a one of two predefined composition orders. Each lens composes in either a front-to-back or a back-to-front order. In an alternate embodiment, the order in which a lens composes (i.e. front-to-back or back-to-front) can be independently set for each lens through the user interface tool 128. The order in which a lens composes (i.e. the composition order of each lens) is independent of and distinct from the order in which the objects in the scene list 400 are layered. The composition order of a lens is a property of a lens that may significantly alter the final appearance of a scene after it is composed at step 204.

Figure 5:
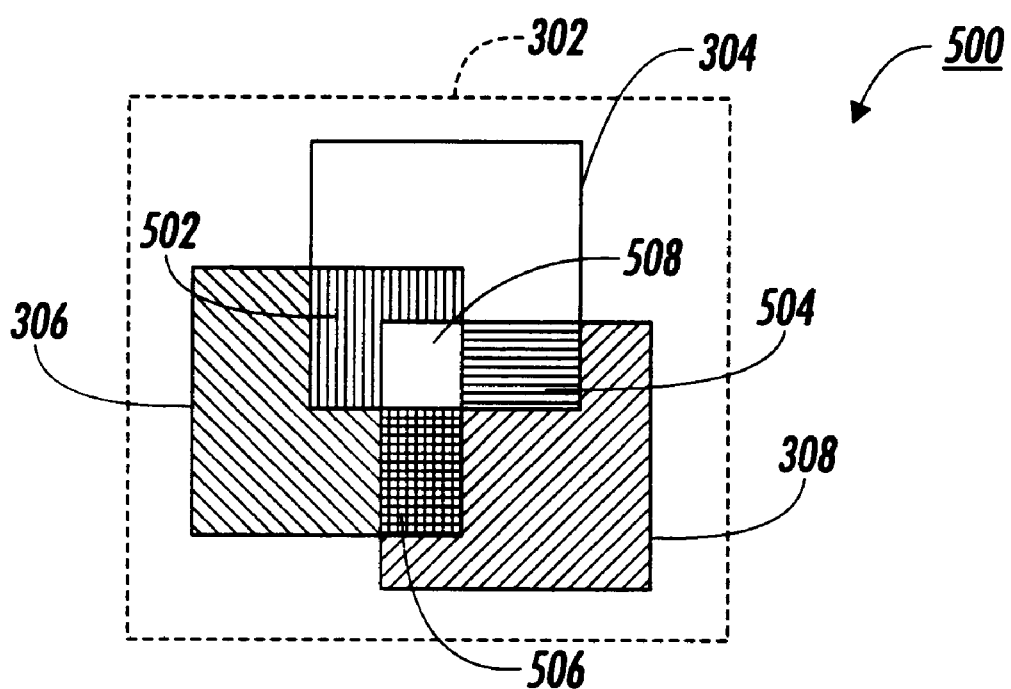
FIG. 5 illustrates a composed scene of the non-composed scene shown in FIG. 3.

At step 204, a scene which has been defined at steps 200 and 202 is composed and rendered. A scene, which is defined by a list of shapes, is composed when the list of shapes is reduced to an image described in a device independent format such as Postscript. A scene is rendered when the image of a scene described by some PDL is reduced to a device dependent format for display or reproduction on a recording medium. For example, FIG. 5 illustrates a composed scene 500 of the non-composed scene 300 shown in FIG. 3. Generally, objects defined as lenses compose by overlapping them with other objects. The solution to composing a scene becomes complex as soon as two or more lenses overlap in a scene. For example, the composed scene 500 of the non-composed scene 300 defined in FIG. 3 now has a total of eight different regions (including the background) with each region having a distinct color as illustrated by the different fill patterns in FIG. 5. The overlapping regions indicated by reference numbers 502, 504, and 506 are tinted by two lenses, whereas the overlapping region indicated by reference number 508 is tinted by three lenses.

D. Composing A Scene With Overlapping Lenses

The present invention concerns composing a scene with overlapping objects wherein more than one of the objects is specified as a lens (or SG filter). Each lens has a lens operator with a predefined composition order (i.e., back-to-front or front-to-back). When the scene is rendered for display on screen 114, each object ordered in a scene list is composed (if necessary) and layered in back-to-front order. When an object specified as a lens is composed, the lens operator of the lens is applied to all of the objects in the scene layered behind or under it. The result of the composition is clipped to the lens boundary and drawn into the image on the display screen 114. Depending on the type of lens, two lenses that overlap compose in either back-to-front or front-to-back order. Each object in the scene list specified as a lens is frozen when it is overlapped by another object that is specified as lens. Controlling when a lens is frozen determines the order in which each object in the scene is composed.

FIGS. 6A–6G are flow diagrams which set forth the steps for performing the operations that compose a scene of shapes with overlapping lenses at step 204 in FIG. 2. Each flow diagram shown in FIGS. 6A, 6B, 6C, 6D, 6E, 6F, and 6G are set forth hereinbelow using pseudo code at Tables 1, 3, 4, 5, 6, 7, and 8, respectively. In addition, Table 2 sets forth step 610 in FIG. 6A in pseudo code. Lenses are composed using a model-in-model-out method of operation. When a scene is composed with a model-in-model-out method of operation, a model of a scene is passed to a lens and a new model of a scene is created as perceived through the lens.

Figure 6A:
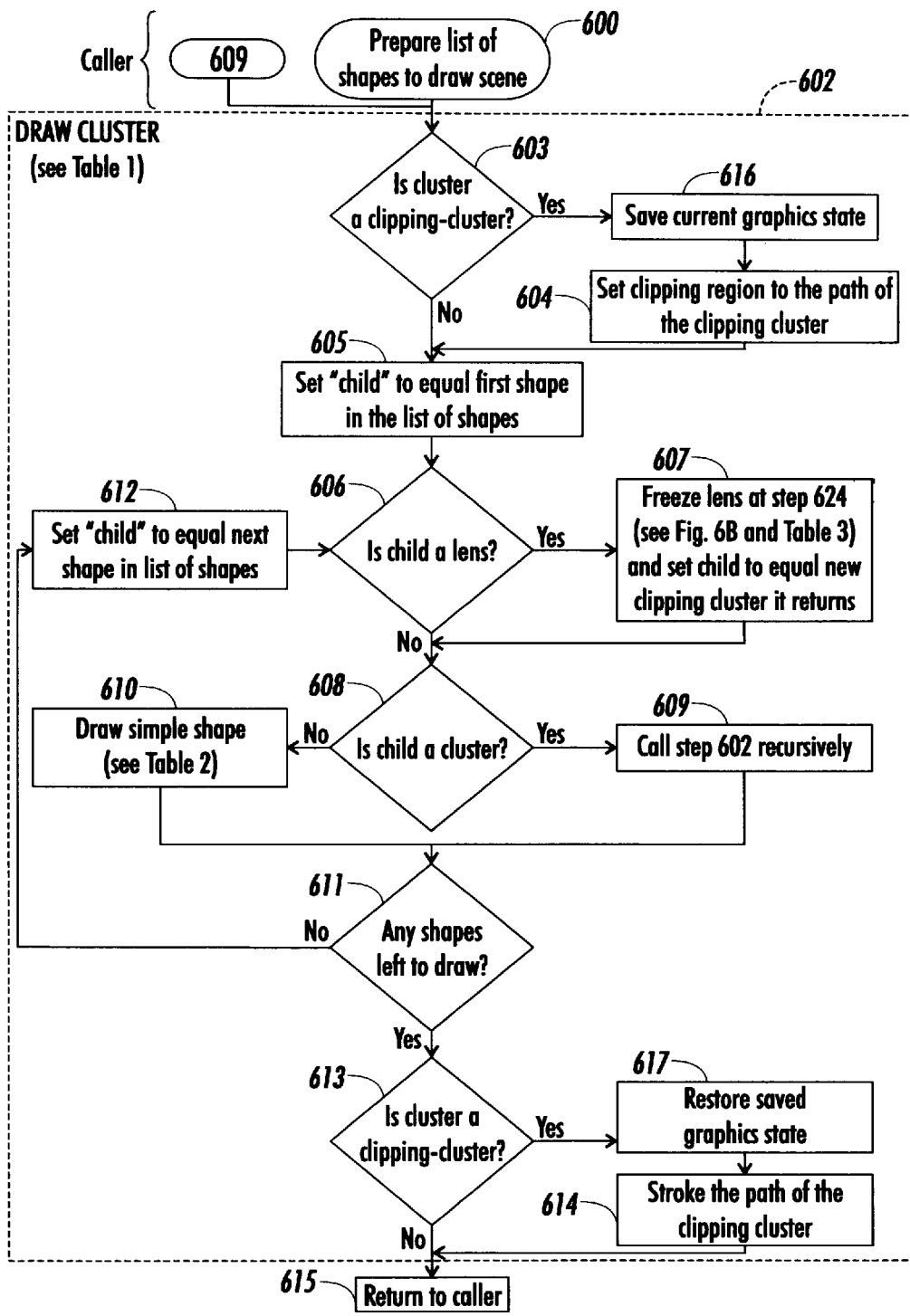
FIG. 6A is a flow diagram that sets forth the steps for performing the operations that compose a scene of shapes with overlapping lenses.

The flow diagram in FIG. 6A, which is set forth in pseudo code in Table 1, begins at step 600. Before performing step 600, all of the shapes in an electronic illustration (i.e., a scene) are stored in memory 112 in an ordered list which is defined herein as a scene list. An example of a scene list is the scene list 400 shown in FIG. 4. A scene list is described in the illustration program 122 as a cluster (a non-clipping cluster) with children shapes. The children shapes of a cluster include a background rectangle which has a background color. In addition, the children shapes include the other shapes that define the scene. Once each of the objects (or shapes) used to define a scene are ordered so as to form a cluster, each of the objects in that cluster are rendered in back-to-front order at step 602 into Postscript for display on the screen display 114 or for printing on a recording medium at printer 124.

TABLE 1

```
def cluster.draw (shape, shape_list) (# draws clusters or clipping clusters
    # Note a scene can be a cluster which is list of shapes, and
    # the first shape in a scene is a background rectangle which has
    # a background color.
    if shape.is_clipper = true then {
        save the graphics state before adding a new clipping path;
        clip to the path shape.clipper;
    };
    for each child in shape do in back-to-front order {
        if child is a lens then { child := freeze_lens (child, shape_list)};
        if child is a cluster then cluster.draw (child, shape_list)
        else simple_shape.draw (child, shape_list);
    }
    if shape.is_clipper = true then {
        restore the saved graphics state to remove the clipping path;
        stroke the path of shape.clipper;
    };
}
```

Figure 7:
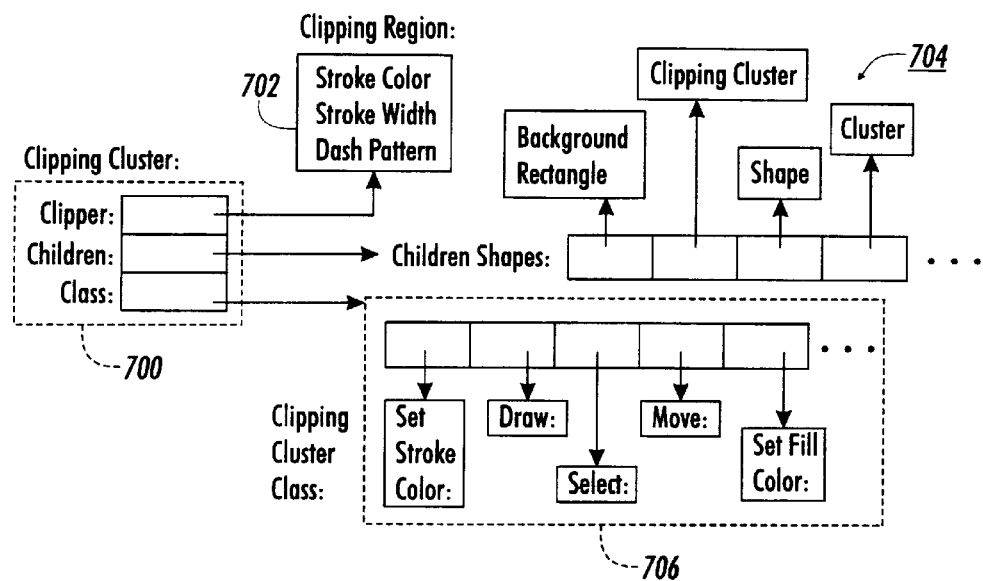
FIG. 7 illustrates a generic data structure of a clipping cluster.

FIG. 7 illustrates a generic data structure of a clipping cluster 700. The clipping cluster 700 is a grouping of individual objects similar to a cluster (i.e., non-clipping cluster). Unlike a non-clipping cluster, an object that is defined as a clipping cluster includes a clipping region 702. In addition, a clipping cluster includes an ordered list of children shapes 704 similar to a cluster (i.e., non-clipping cluster). Each of the children shapes of a clipping-cluster 700 or non-clipping cluster can either be a simple shape, a cluster, or a clipping cluster. The clipping region 702 of a clipping cluster is generated using rendering procedures set forth in a class of procedures 706. The children shapes of the clipping cluster are drawn in back-to-front order, followed by a border pattern of the last shape, if necessary.

Referring again to FIG. 6A, the draw cluster step 602 is performed for either clusters or clipping clusters by stepping through a scene list (or shape-list) to draw each object in the cluster in back-to-front order. The step 602 of drawing a cluster is called by either the draw scene step 600 or step 609, which are discussed below. At step 600, a command is received to draw a scene. At this step, the scene list which defines a scene is passed to the draw cluster step 602 as a list of shapes (i.e. shape-list). It should be noted that the scene list which is represented as a cluster can include objects that are clusters or clipping clusters. Step 602 begins by determining whether the list of shapes that is lo passed to it is a clipping cluster. If the list of shapes is a clipping cluster then steps 616 and 604 are performed; otherwise, step 605 is performed. At step 616, Postscript commands are generated to save the current graphics state of the scene being rendered. A graphics state records the current graphic control parameters which define the global framework in which operators of a PDL imaging model execute. By saving the current graphics state, the current clipping region is saved. At step 604, the clipping region of the cluster being drawn is set to clip to the path of the clipping cluster. In keeping with the operation of PDLs such as Postscript, this clipping path augments any clipping path already in force as part of the graphics state, resulting in a combined clipping region that is as small or smaller than the previous clipping region. At step 605, a "child" variable is set to equal the first shape in the list of shapes passed to the draw cluster step 602. At step 606, if the child variable is determined to be a lens, step 607 is performed; otherwise, step 608 is performed. At step 607 the lens identified at step 606 is frozen at step 624 (shown in FIG. 6B), and the child variable is set equal to the new cluster that step 624 returns. At step 608, if the child variable is determined to be a cluster then step 609 is performed; otherwise, step 610 is performed. At step 609, step 602 to draw a cluster is performed recursively for the cluster identified at step 608.

At step 610, a simple shape of a scene is drawn, the details of which are set forth in Table 2. A simple shape is drawn using the operators of a PDL imaging model such as Postscript. These operators are used to define the shape of the object in a device independent format. For example, the outline of a simple shape is rendered into bits or another device dependent format by emitting and then executing PostScript commands such as moveto, lineto, arcto, or curveto. In addition, a simple shape may have a fill color, which sets forth the color of the region defined by the simple shape's outline. Finally, after rendering the outline and fill of a simple shape, the border of the shape is rendered using the PostScript stroke command, if necessary.

TABLE 2

```
def simple_shape.draw (shape, shape_list) {
    # draw the interior of the shape if any
    # define the path using PostScript commands like moveto,
    # lineto, arcto, curveto
    # define the filling color using PostScript commands like rgbcolor
    # use the "fill" PostScript command to fill the path with the filling color.
    # stroke the boundary of the shape if needed
}
```

At step 611, if the child variable is the last shape in the list of shapes, then step 613 is performed; otherwise, step 612 is performed. At step 612, the child variable is set equal to the next shape in the list of shapes and step 606 is repeated. At step 613, if the cluster is a clipping cluster, then steps 617 and 614 are performed; otherwise, step 615 is performed. At step 617, Postscript is emitted to restore the graphics state of the scene being rendered. At step 614, the path of the clipping cluster is stroked. A path is stroked when a line of some thickness along a path built using construction operators (e.g., moveto, lineto, closepath) is drawn. At step 615, the step 602 terminates and returns to one of steps 609 or 600.

Figure 6B:
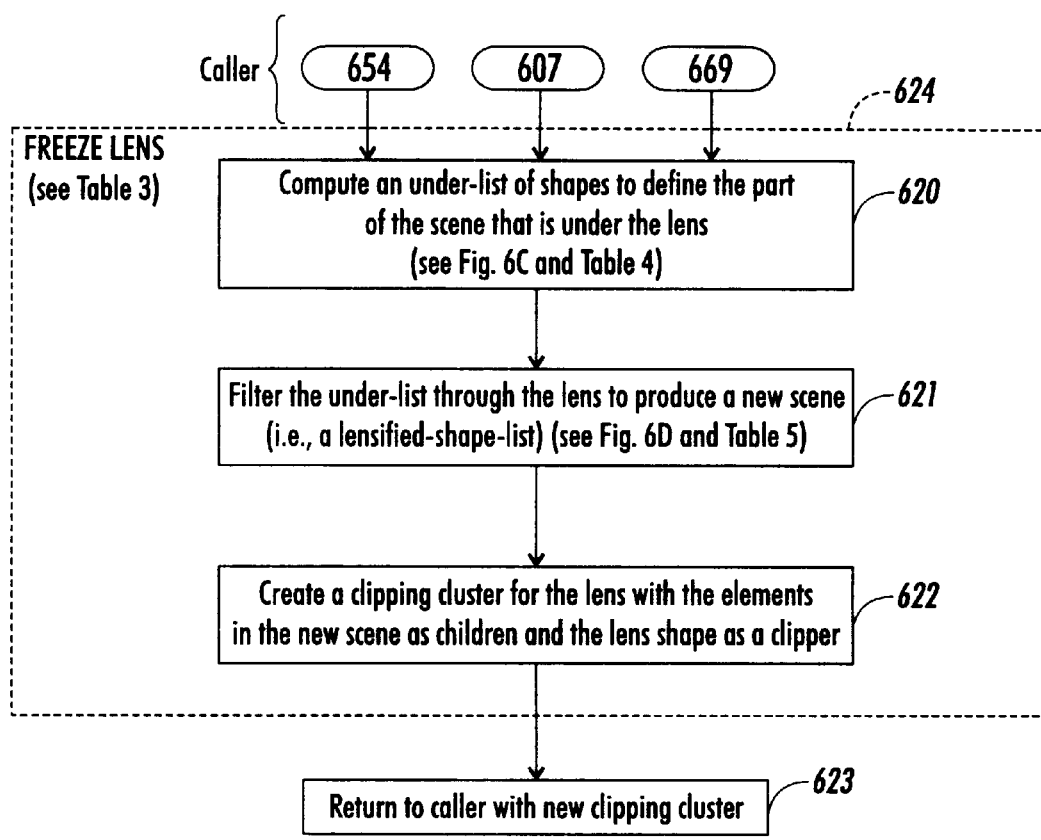
FIG. 6B is a flow diagram that sets forth the steps for performing step 624 shown in FIG. 6A.

At step 624 shown in FIG. 6B, an object (e.g., a shape) that is defined as a lens filter is frozen. The steps shown in FIG. 6B are set forth in pseudo code in Table 3. As set forth above, when a lens filter is frozen it is turned into a clipping cluster. Generally, a lens is frozen when it is replaced with a cluster of shapes that are formed independently of other shapes. Step 624, which includes three steps, is called from either step 654 (FIG. 6E), step 607 (FIG. 6A), or step 669 (FIG. 6F). Initially at step 620, an under-list of shapes is computed, the details of which are forth in FIG. 6C. The under-list of shapes defines that part of the scene that is under the lens. Subsequently at step 621, the under-list computed at step 620 is filtered through the lens which is being frozen to produce a new scene. Details of step 621 are set forth in FIG. 6D. The new scene (i.e., lensified-shape-list) does not have any shapes which are dependent on other shapes for their definition (i.e., lenses). Finally at step 622, a clipping cluster is created for the lens with the elements in the new scene (computed at step 621) as children and the lens shape as a clipper. After creating a clipping cluster at step 622, step 623 is performed which returns the newly created clipping cluster to one of the callers at steps 654, 607, or 669.

TABLE 3

```
def freeze_lens (lens_shape, lens, under_list) returns (new_cluster) {
    new_under_list := compute_under_list (under_list, lens_shape);
    # new_under_list includes a background rectangle as its first shape
    lensified_shape_list := scene_from_scene (lens, new_under_list);
    # create a clipping cluster for the elements in lensified_shape_list
    new_cluster := make_cluster (children: lensified_shape_list,
                                clipper: copy(lens_shape), is_clipper: true);
    return (new_cluster);
}
```

Figure 6C:
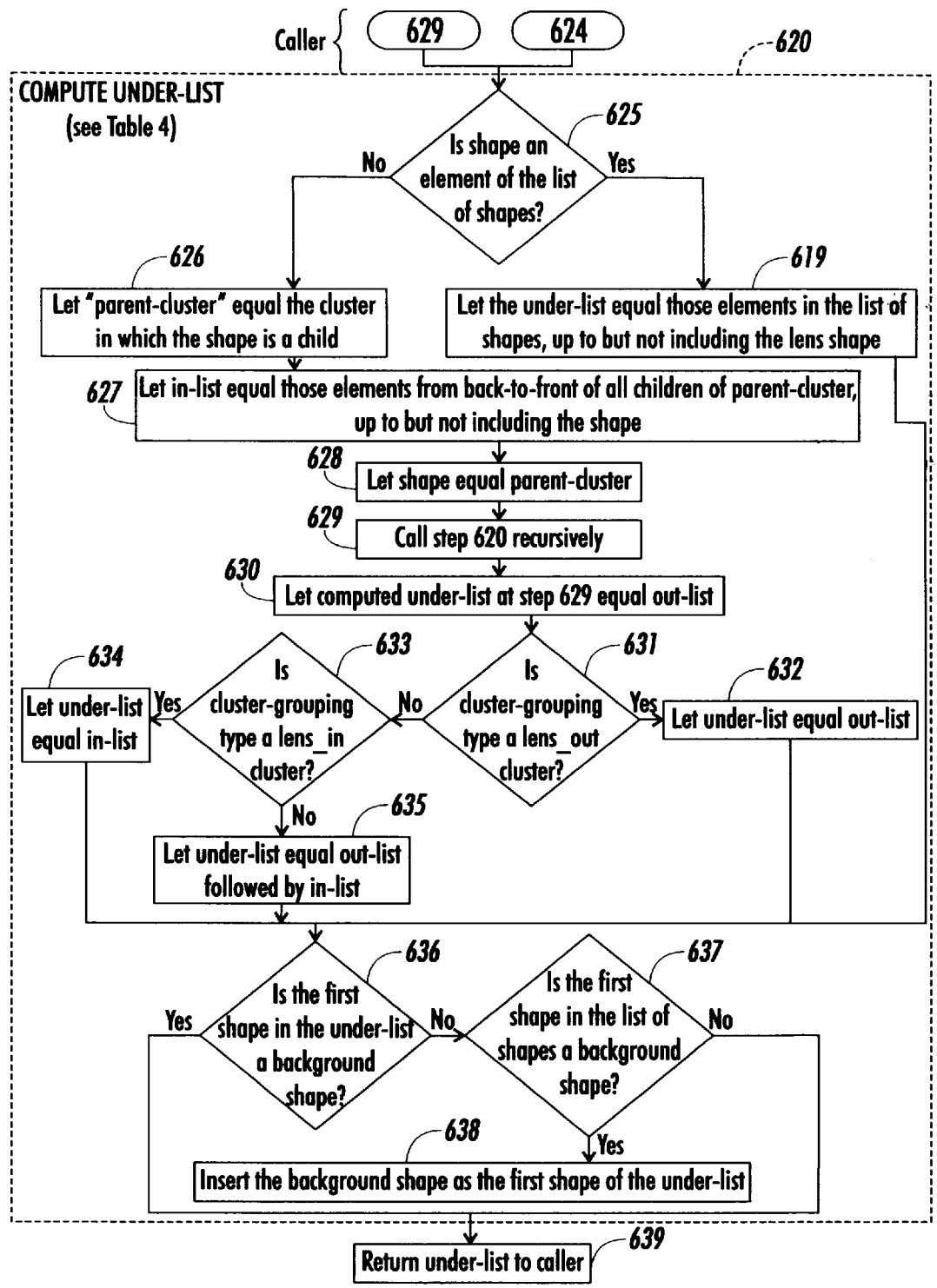
FIG. 6C is a flow diagram that sets forth the steps for performing step 620 shown in FIG. 6B.

FIG. 6C sets forth in detail steps for computing an under-list at step 620 in FIG. 6B. In addition, Table 4 sets forth the steps shown in FIG. 6C in pseudo code. Step 620 is called from either step 629 or in step 624 which steps pass a current shape and a current list of shapes (i.e., shape-list) to be used for computing an under-list for the current shape. At step 625, a determination is made as to whether the current shape for which an under-list is being computed for the current shape-list, forms part of the current shape-list or not. If the current shape is an element of the current shape-list then step 619 is performed; otherwise, ones of steps 626-638 are performed. At step 619, an under-list is computed for the current shape by identifying all of the elements in the current shape-list up to but not including the current shape (e.g., lens), ordered in back-to-front order.

Steps 626-638 in FIG. 6C concern the computation of an under-list forming part of one of three cluster-groupings which are described in detail in FIG. 26 below. Briefly, the different cluster-groupings include a lens in & out cluster, a lens-in cluster, and a lens-out cluster. At step 626, a parent-cluster variable is set equal to the cluster in which the shape is a child in the current shape-list. At step 627, those shapes from back-to-front in the current shape-list up to but not including the current shape in the parent-cluster are set equal to a lens-in cluster (i.e., an in-list). The current shape is then set equal to the parent-cluster at step 628. At step 629, step 620 is called recursively. At step 630 the computed under-list returned from step 629 is set equal to a lens-out cluster (i.e., out-list).

If the cluster-grouping type of the current lens is a lens-out cluster at step 631, then step 632 is performed; otherwise, step 633 is performed. At step 632, the computed under-list is set equal to the lens-out cluster computed at step 629. If the cluster-grouping type of the current lens is a lens-in cluster at step 633, then step 634 is performed; otherwise, step 635 is performed. At step 634, the computed under-list is set equal to the lens-in cluster computed at step 630. At step 635, the computed under-list is set equal to the lens-out cluster followed by the lens-in cluster to define a lens in & out cluster. If the first shape of the under-list is a background shape at step 636, then step 639 is performed; otherwise step 639 is performed. If the first shape of the list of shapes (i.e., the shape-list) has a background shape at step 637, then step 638 is performed; otherwise, step 639 is performed. At step 638 the background shape of the list of shapes is inserted as the first shape of the under-list. At step 639, the computed under-list at step 620 is returned to one of the callers at steps 629 or 624.

TABLE 4

```
def compute_under_list (shape_list, shape) returns (under_list) {
    if shape is an element of shape_list {
        under_list := those elements of shape_list,
                up to but not including shape;
    }
    else { # shape is an element of a cluster
        parent := the cluster of which shape is a child;
        # compute the in_list and the out_list
        in_list := those elements from back to front of all children of parent,
                up to but not including shape;
        out_list := compute_under_list (shape_list, parent);
        if parent.lens_type = "in" { under_list := in_list }
        else if parent.lens_type = "out" (under_list := out_list }
        else { under_list := out_list followed by in_list };
    }
    if under-list does not have a background shape {
        if shape-list has a background shape {
            insert a copy of the background shape of shape-list in under-list;
        }
    }
    return (under_list); # return computed structure of the list under the shape
}
```

Figure 6D:
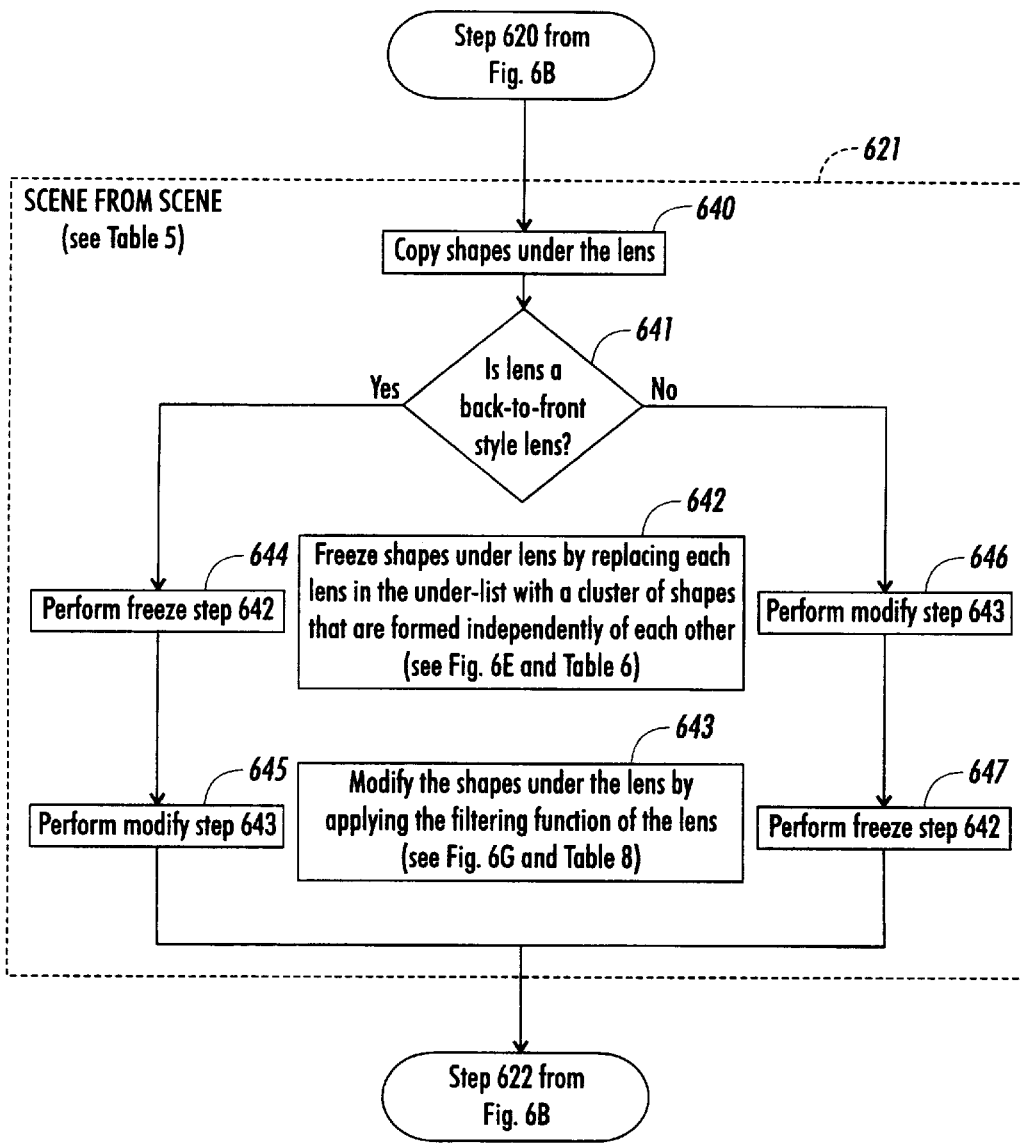
FIG. 6D is a flow diagram that sets forth the steps for performing step 621 shown in FIG. 6B.

FIG. 6D sets forth the steps for filtering an under-list through a current lens to produce a new scene at step 621 in FIG. 6B. In addition, Table 5 sets forth the steps shown in FIG. 6D in pseudo code. Initially at step 640, the shapes in the under-list (i.e., shape-list) computed at step 620 are copied. At step 641 a determination is made as to whether the current lens being frozen at step 624 is a back-to-front or a front-to-back lens type. Depending on the type of lens being frozen at step 624, steps 642 and 643 are performed in different orders. If the lens type is a back-to-front style lens then freezing step 642 is performed followed by modifying step 643 as indicated by steps 644 and 645, respectively. Otherwise, if the lens type is a front-to-back style lens then modifying step 643 is performed followed by freezing step 642, as indicated by steps 646 and 647, respectively. Briefly, step 642 freezes any lenses layered under the current lens that is being frozen, while step 643 modifies each shape under the current lens in accordance with the operator (i.e., filtering function) of the current lens. The output of step 621 is a lensified-shape-list which is a representation of a scene defined by an under-list through a lens. The lensified-shape-list does not have any shapes which are dependent on other shapes to be formed.

TABLE 5

```
def scene_from_scene (lens, under_list) returns (lensified_shape_list) {
    if lens.back_to_front = true then {
        lensified_shape_list := freeze_chlldren (lens, under_list);
        modify_children (lens, lensified_shape_list);
    }
    else { # lens is front to back
        lensified_shape_list := copy_all_shapes_in (under_list);
        modify_children (lens, lensified_shape_list);
        lensified_shape_list := freeze_children (lens, lensified_shape_list);
    }
    return (lensified_shape_list); # return scene filtered using function of lens
}
```

Figure 6E:
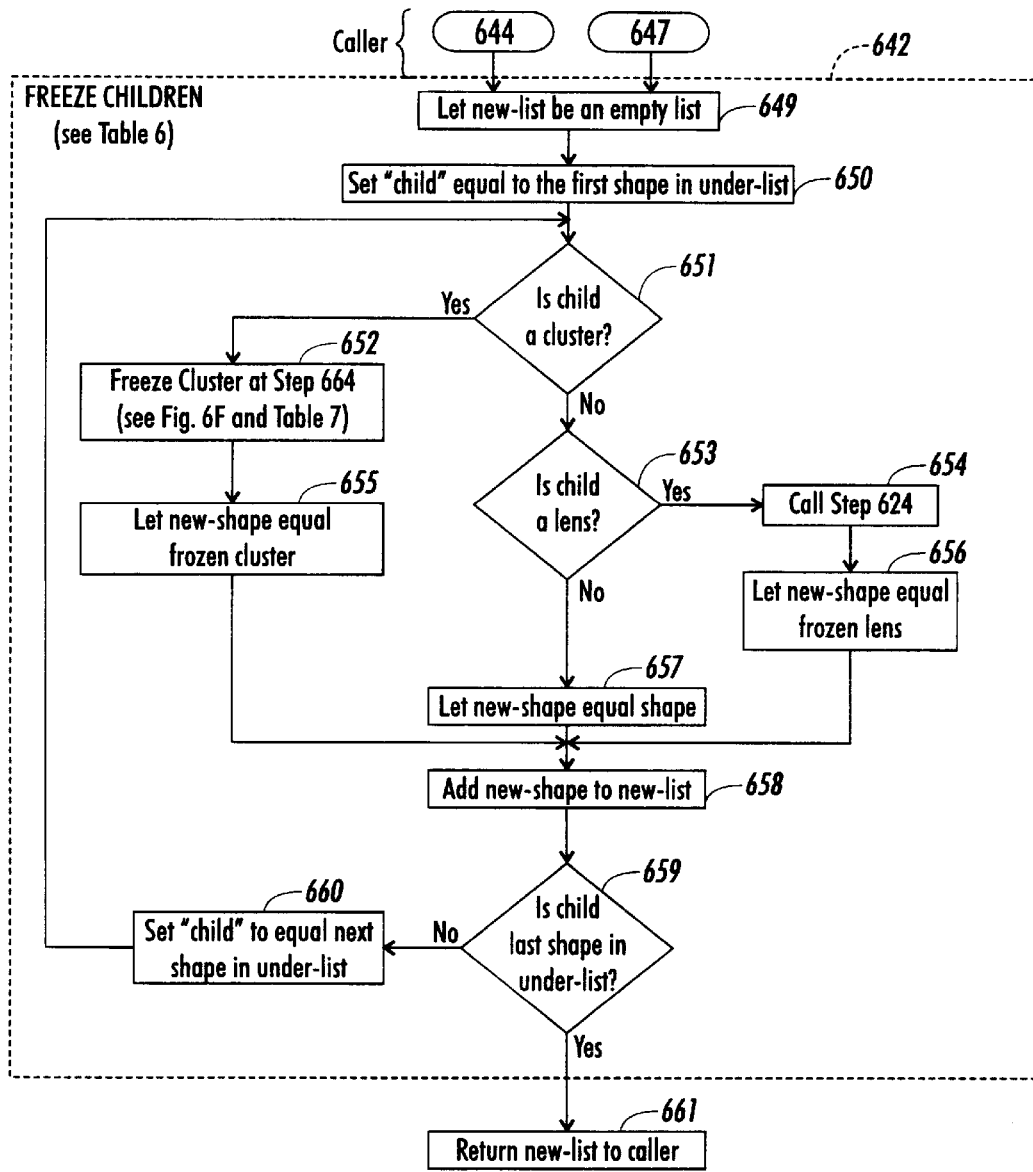
FIG. 6E is a flow diagram that sets forth the steps for performing step 642 shown in FIG. 6D.
Figure 6F:
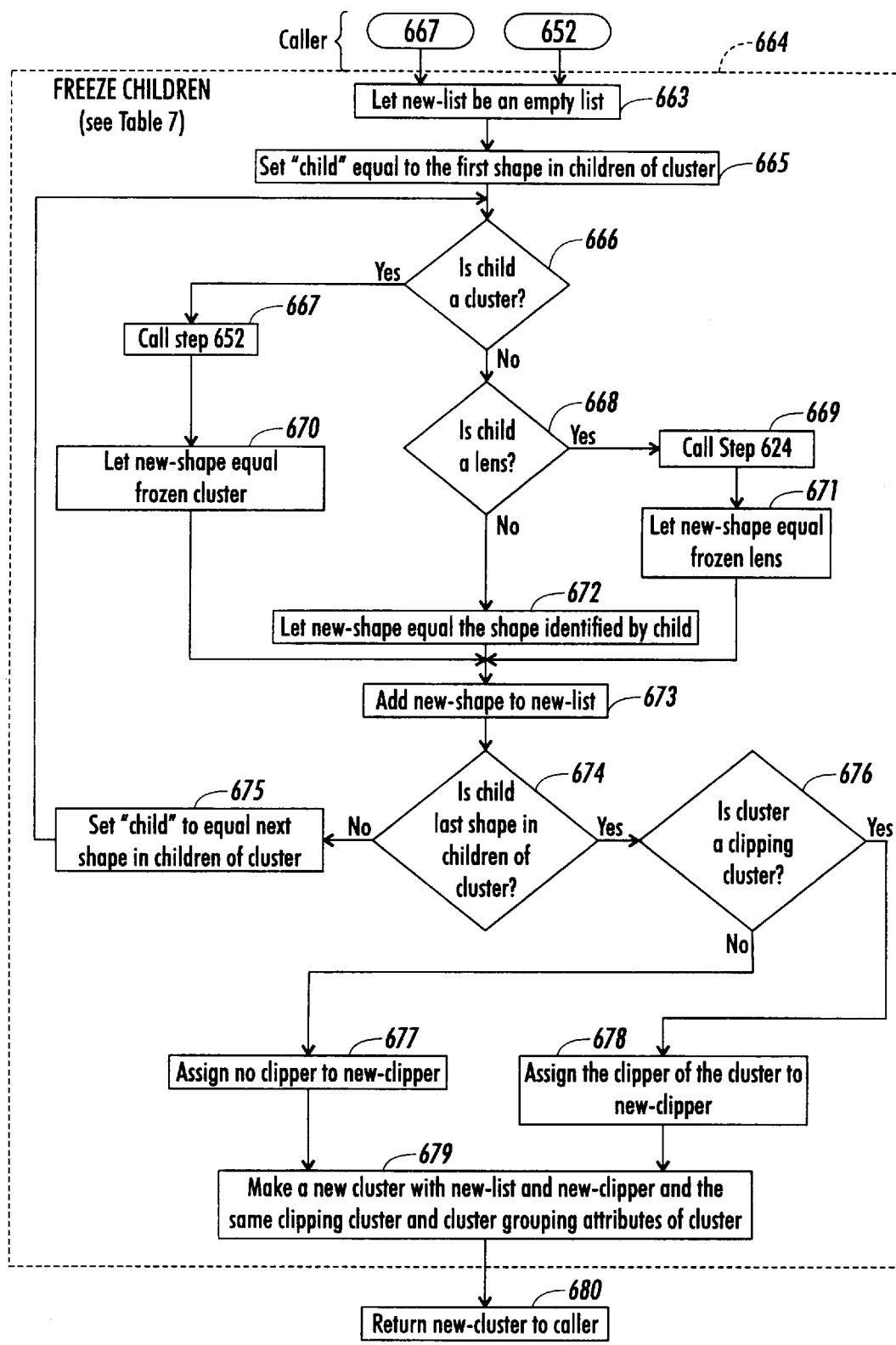
FIG. 6F is a flow diagram that sets forth the steps for performing step 664 called at step 652 in FIG. 6E.

FIG. 6E sets forth the steps for performing step 642 shown in FIG. 6D. In addition, Table 6 sets forth step 642 in pseudo code. In general step 642 freezes shapes in the under-list of a current lens (i.e., children) by replacing each lens in the under-list with a cluster of shapes that are formed independently of each other. As shown in FIG. 6D, step 642 is called from either steps 644 or 647. Step 642 is passed a current lens and an under-list when it is called. At step 649, a new list is defined and set equal to an empty list. At step 650, a "child" variable is set to identify the first shape in the under-list. If the shape that the child variable identifies is a cluster at step 651, then step 652 is performed; otherwise step 653 is performed. At step 652, the cluster is frozen at step 664 shown in FIG. 6F. That is, any shapes that are lenses are removed and replaced with a cluster of shapes which are formed independently of each other. Subsequently, at step 655 a new-shape is defined to be the frozen cluster determined at step 652. If the shape that the child variable identifies is a lens at step 653, then step 654 is performed, otherwise step 657 is performed. At step 654, step 624 to freeze the lens defined by that the child variable identifies.

Subsequently, at step 656 a new-shape is defined to be the returned frozen lens. At step 657, a new-shape is defined by the shape which the child variable identifies. At step 658, the new-shape is added to form part of a new list. If the child variable identifies a shape which is equal to the last shape in the under-list at step 659, then step 661 is performed; otherwise, step 660 is performed. At step 660, the child variable is set to identify the next shape in the under-list. Finally at step 661, the new-list defined at step 658 is returned to the caller at steps 644 or 647.

TABLE 6

```
def freeze_children (lens, under_list) returns (new_list) {
    new_list := an empty list;
    for each shape "x" in under_list {
        if x is a cluster then {new_shape := freeze_cluster (x, under_list) }
        else if x is a lens then {
            new_shape := freeze_lens (x, x.lens, under-list) }
        else {new_shape := (if lens.back_to_front = true then copy(x) else x)};
        new_list := append (new_list, new_shape);
        }
    return (new_list);
    }
```

FIG. 6F sets forth the steps for performing step 652 shown in FIG. 6E. In addition, Table 7 sets forth step 652 in pseudo code. In general, step 643, which is called either by steps 667 or 652, freezes a cluster passed thereto.

Freezing a cluster freezes those lenses that form part of the cluster. More specifically, step 664 begins by defining a new list and setting it equal to an empty list at step 663. At step 665, a child variable is set to identify the first shape in the ordered list of the cluster. If the child variable identifies a cluster at step 666, then step 667 is performed; otherwise, step 668 is performed. At step 667, step 652 is called recursively. Subsequently, the frozen cluster returned at step 667 is set to equal a new-shape. If the child variable identifies a lens at step 668, the step 669 is performed; otherwise, step 672 is performed. At step 669, step 624 is called which freezes the lens identified at step 668. The result from the frozen lens is set to equal a new-shape at step 671. At step 672, the shape identified by the child variable is set to equal a new-shape. Subsequently, the new-shape defined at either of steps 670, 671, or 672 is added to a new-list. If the child variable is the last shape in the ordered list of the cluster, at step 674, then step 676 is performed; otherwise, step 675 is performed. At step 675, the child variable is set to identify the next shape in the ordered list of the cluster. If the cluster is a clipping cluster at step 676, then step 678 is performed; otherwise step 677 is performed. At step 678, the clipping region of the cluster is set to equal that of a new-clipper. At step 677, no clipper is assigned to the new-clipper. At step 679, a new cluster is created with the new-list built at step 673 and the new-clipper defined at either of steps 677 or 678. Also at step 679, the new cluster is assigned the same clipping cluster and cluster grouping attributes of the cluster. The new cluster is then returned to its caller at step 680.

TABLE 7

```
def freeze_cluster (cluster, under_list) returns (new_cluster) {
    new_list := empty list;
    for each child "x" of cluster {
        if x is a cluster then { new_shape := freeze_cluster (x, under_list) }
        else if x is a lens then {
            new_shape := freeze_lens (x, x.lens, under_list) }
        else { new_shape := if lens.back_to_front then copy(x) else x };
        new_list := append (new_list, new_shape);
        }
    if cluster.is_clipper then { new_clipper := if lens back_to_front
        then copy (cluster.clipper) else cluster.clipper }
    else { new_clipper := None };
    new_cluster := make_cluster (children: new_list,
        clipper: new_clipper, is_clipper: cluster.is_clipper);
    return (new_cluster);
    }
```

Figure 6G:
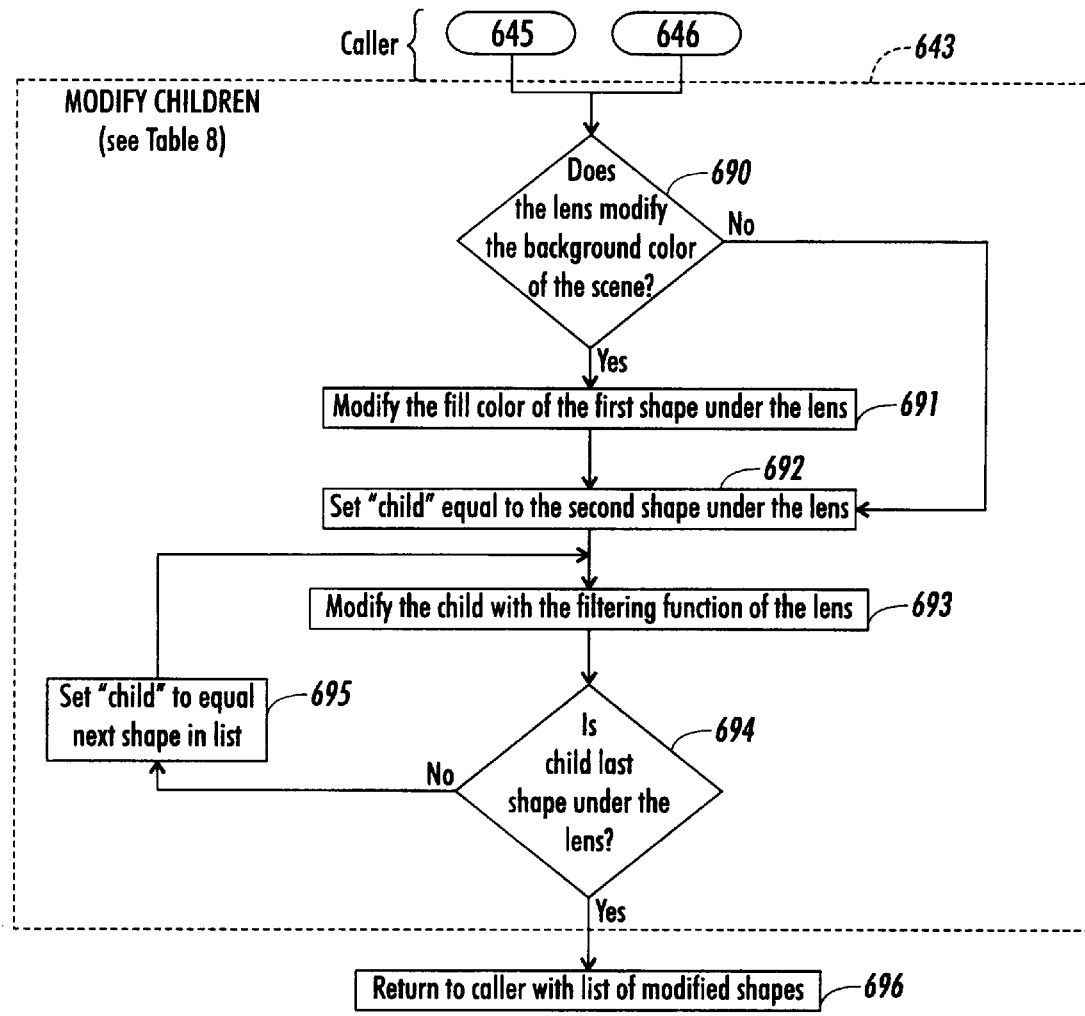
FIG. 6G is a flow diagram that sets forth the steps for performing step 643 shown in FIG. 6D.

FIG. 6G sets forth the steps for performing step 643 shown in FIG. 6D. In addition, Table 8 sets forth step 643 in pseudo code. In general, step 643 modifies those shapes under a lens by applying the filtering function (i.e., lens operator) of the lens thereto. Step 643 is called from either step 645 or step 646 with a lens and a list of shapes that are under the lens (i.e., shape_list). The list of shapes under the lens can include lenses because modify step 643 may have been called before freeze step 642. The lens passed to step 643 is used to identify the filtering function that is to be applied to each shape in the list of shapes. If the filtering function of the lens modifies the background color of the scene at step 690, then the fill color of the first element in the list of shape under the lens is modified by the background filtering function of the lens at step 691. As set forth above, a filtering function of a lens can include tinting, scaling, etc. Subsequently, at step 692, a child variable is set to identify the second shape in the list of shapes (i.e., shape_list). At step 693, the shape identified in the list of shapes under the lens by the child variable is modified by the filtering function of the lens. It will be understood by those skilled in the art that modify step 693 accounts for shapes identified by the child variable that are clusters by recursively modifying each of the children shapes of a cluster with the appropriate filtering function of the lens. If the shape identified by the child variable is not the last shape in the list of shapes under the lens at step 694, then step 695 is performed; otherwise, step 696 is performed. At step 695, the child variable is set to identify the next shape in the under-list. At step 696, step 643 terminates by returning to either step 645 or step 646.

TABLE 8

```
def modify_children (lens, shape_list) {
    if the lens modifies background color then {
        lens.modify (first element of shape_list)
        }
    # apply the lens function to each shape in shape_list
    for each shape "x" in shape_list except for the first shape {
        lens.modify (x);
        }
    }
```

It will be understood by those skilled in the art that FIGS. 6A–6G is an outline of the steps for performing the present invention and that numerous different permutations could be possible. The different manner in which the steps set forth in FIGS. 6A–6G could be performed depends on the particular shapes in the scene (e.g. cluster, simple shape, or lens) and the particular manner in which the shapes are ordered in the scene-list.

E. Illustration of Composing A Scene With Overlapping Lenses

The scene of the rectangular objects 304, 306, and 308 layered on top of background rectangle 302 shown in FIG. 3 are defined as lenses that tint underlying objects, cyan, yellow, and magenta, respectively. For example, an object that is filled with a cyan color that is layered under a yellow lens is tinted green. The following description steps through the flow diagram shown in FIGS. 6A–6G to illustrate the manner in which the scene 300 defined in FIG. 3 is composed as the scene 500 shown in FIG. 5.

Figure 8:
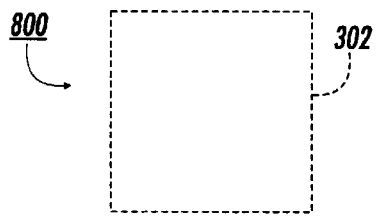
FIG. 8 illustrates the beginning of a sequence of images to produce the composed scene shown in FIG. 5.

At step 600, each object in the scene list 400 shown in FIG. 4 is composed in back-to-front order (in the direction of arrow 402) and rendered either on a display or a recording medium. The first shape in the scene list 400 is the background rectangle 302. Because the white background rectangle 302 is a simple shape, it is drawn by performing step 610 the result of which is shown in scene 800 shown in FIG. 8.

Figure 9:
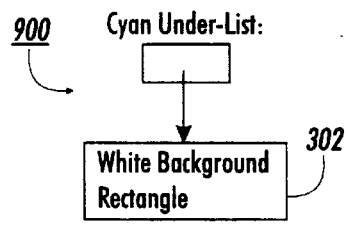
FIG. 9 illustrates the under-list for the cyan lens 304.
Figure 10:
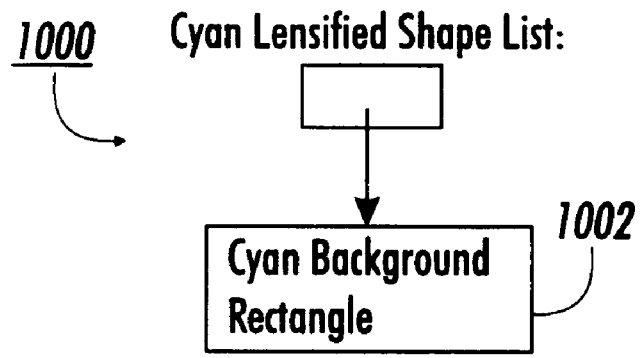
FIG. 10 illustrates the list of shapes after the property of the cyan lens is applied to the cyan under-list.

After the background rectangle 302, the cyan rectangle 304 is the next element in the scene list 400. To draw the cyan rectangle 304, step 607 is performed for shapes that are lenses. Before drawing the lens as a simple shape at step 610, an under-list 900, which is shown in FIG. 9, of the rectangle 304 is computed at step 620. As shown in FIG. 9, the under-list 900 consists only of the white background rectangle 302. After performing step 620, the scene defined by the under-list 900 is filtered through the lens specified by rectangle 304 at step 621. Since the lens is a back-to-front style lens, freeze step 644 is performed followed by modify step 645 to compute a lensified-shape-list. Since there is only a simple shape under the lens 304 (e.g., the background rectangle 302), no lenses are frozen and the background rectangle 302 is tinted cyan to produce a lensified-shape-list 1000 which is shown in FIG. 10. The lensified-shape-list 1000 is the output of step 621.

Figure 11:
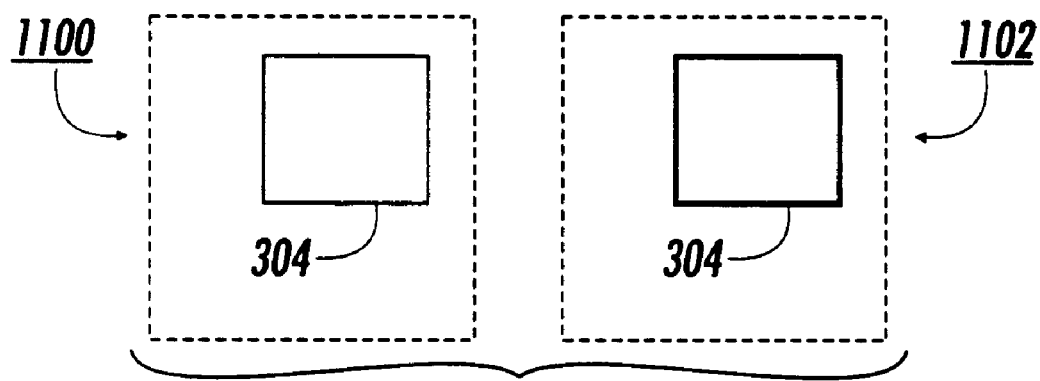
FIG. 11 continues the sequence of images in FIG. 8 to compose the cyan lens.

Using the lensified-shape list 1000 shown in FIG. 10, a clipping cluster is created at step 622. Part of drawing a clipping cluster is to set the path of the rectangle 304 to be the clipping region of the scene at step 604. The shapes in the lensified-shape-list 1000 which are used to create a cluster are drawn at step 610, namely a background rectangle with a cyan color fill 1002. Finally, step 614 is performed to stroke the boundary of the rectangle 304. These steps are represented on the display 114 as shown in FIG. 11 by initially drawing the cyan lens 304, illustrated by scene 1100, and then by drawing the border of the cyan lens 304 illustrated by scene 1102.

Figure 12:
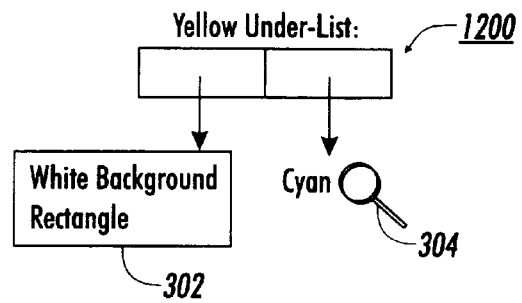
FIG. 12 illustrates the under-list computed for the yellow lens 306.
Figure 13:
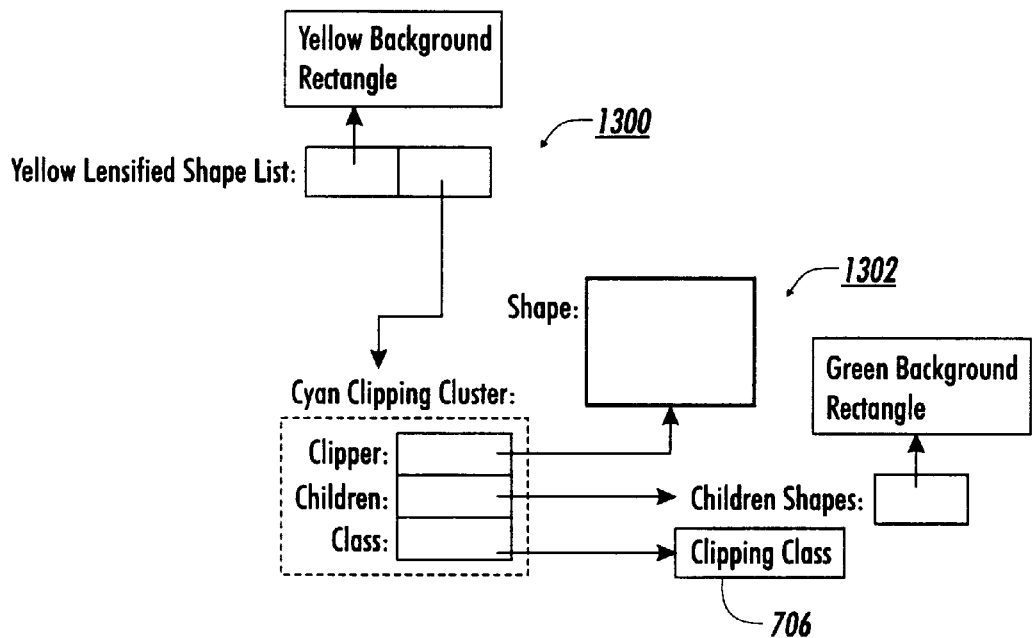
FIG. 13 illustrates the list of shapes after the lenses in the yellow under-list are frozen and the property of the yellow lens is applied to the yellow under-list.

After drawing the cyan lens 304, the yellow lens 306 is drawn by first freezing the lens at step 607. Similar to the cyan lens, an under-list 1200, which is shown in FIG. 12, is computed at step 620 for the yellow lens 306. The under-list 1200 includes the background rectangle 302 and the cyan lens 304. Subsequently, any lenses in the under-list 1200 are frozen at step 644. FIG. 13 illustrates a lensified-shape-list 1300 which is the result of freezing the yellow lens 306 at step 644. The lensified-shape-list 1300 is formed by filtering the under-list 1200 through the lens to produce a new scene at step 645.

The details for creating the lensified-shape-list in FIG. 13 are set forth in FIG. 6D. Initially at step 640, the shapes under the yellow lens 306 (i.e., the under-list) are copied. Subsequently, each copied shape that is a lens is frozen at step 642. In this case, the cyan lens 304 is frozen. The frozen cyan lens 304 is represented by the clipping cluster 1302. Once the shapes in under-list 1200 are copied and frozen, the frozen shapes are modified using the filtering function of the lens, at step 643.

Figure 14:
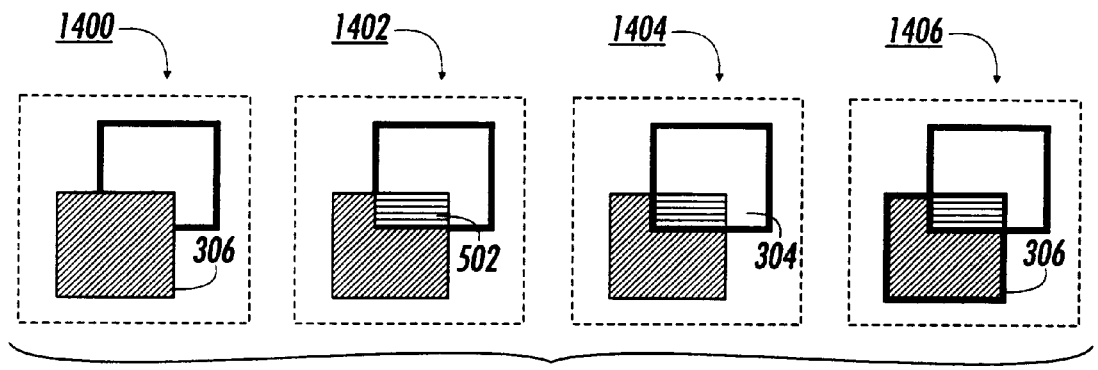
FIG. 14 continues the sequence of images in FIGS. 8 and 11 to compose the yellow lens.

FIG. 14 illustrates the sequence in which the yellow lens 306 is drawn. First, the background color of the yellow lens 306 is drawn as illustrated by scene 1400. Subsequently, a portion of the cyan lens 502, which is tinted green by the yellow lens 306, is drawn as illustrated by scene 1402. To complete the drawing of the yellow lens 306, the borders around the cyan lens 304 and the yellow lens 306 are drawn as illustrated by scenes 1404 and 1406, respectively.

Figure 15:
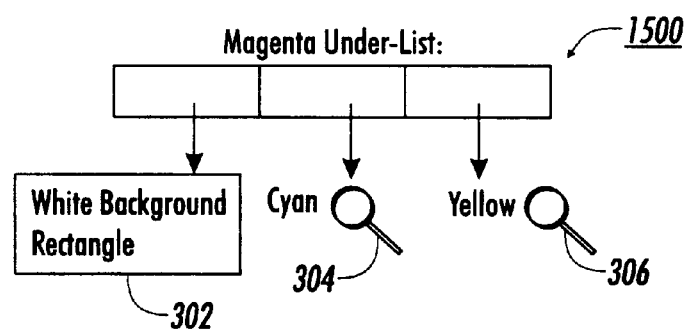
FIG. 15 illustrates the under-list computed for the magenta lens 308.
Figure 16:
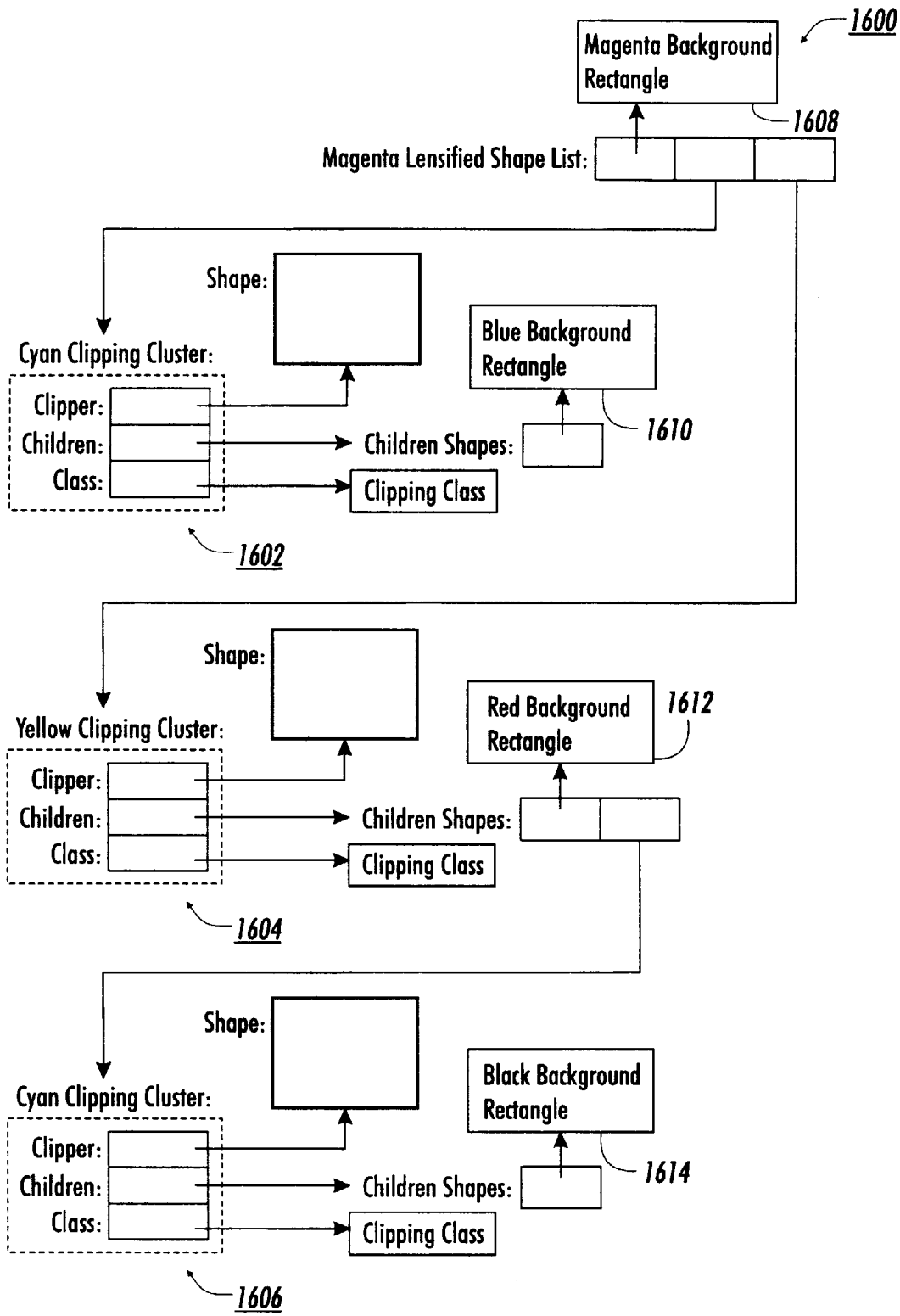
FIG. 16 illustrates the list of shapes after the lenses in the magenta under-list are frozen and the property of the magenta lens is applied to the magenta under-list.

After drawing the yellow lens 306 (or the rectangle 306), the magenta lens 308 is drawn. In order to draw the magenta lens 308 (or the rectangle 308) the shapes under the lens must be frozen at step 607. After performing step 620, an under-list 1500 shown in FIG. 15 is computed for the magenta lens 308. At step 621, the under-list 1500 is filtered through the magenta lens 308 to produce a lensified-shape-list 1600 shown in FIG. 16. The lensified-shape-list 1600 includes a cyan clipping cluster 1602 and a yellow clipping cluster 1604. In addition, part of the yellow clipping cluster 1604 includes a cyan clipping cluster 1606.

More specifically, to compute the lensified-shape-list 1600 each lens in the shape-list 1500 is frozen. After freezing each lens at step 642, the function of the current lens being drawn (i.e. the magenta lens 308) is applied to the frozen shapes of the under-list 1500 at step 643. The first shape modified is the background rectangle which is tinted magenta to define a magenta background rectangle 1608. Second, the cyan clipping cluster 1602 is tinted magenta to define a blue background rectangle 1610 (i.e. cyan tinted magenta). Third, background rectangle of the yellow clipping cluster 1604 is tinted magenta to yield a red background rectangle 1612. Finally, the background rectangle of the cyan clipping cluster 1606 that forms part of the yellow clipping cluster 1604 is tinted magenta and yellow to yield a black background rectangle 1614.

Figure 17:
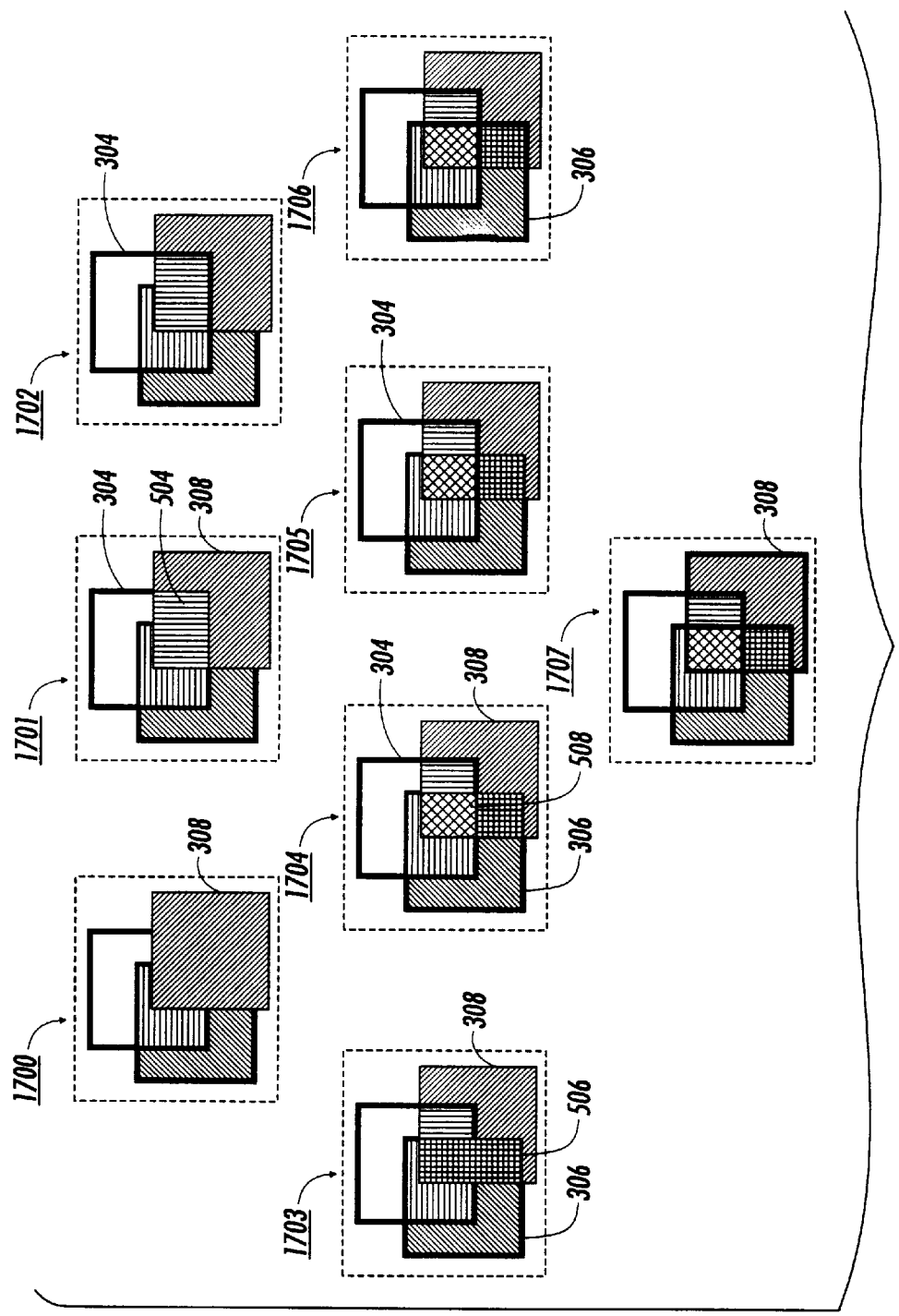
FIG. 17 continues the sequence of images in FIGS. 8, 11 and 14 to compose the magenta lens.

FIG. 17 illustrates a sequence of scenes, indicated by reference numbers 1700–1707, in which the magenta lens 308 is drawn. In scene 1700 the background color of the magenta lens 308 is drawn. Recursively, parts of the cyan lens 304 that are clipped to and tinted by magenta lens 308 are drawn.

First, the overlapping area 504 (i.e., the overlapping area between the cyan lens 304 and the magenta lens 308) is drawn in scene 1701, after which the border around the cyan lens 304 in scene 1702 is drawn. In scene 1703, the overlapping area 506 between the yellow lens 306 and the magenta lens 308 is drawn. Subsequently, the overlapping area 508 (i.e., the overlapping area between the cyan, yellow and magenta lenses, 304, 306, and 308, respectively) is drawn in scene 1704. Finally, the border is drawn around the cyan lens 304, the yellow lens 306, and the magenta lens 308, in scenes 1705, 1706, and 1707, respectively.

F. Front-To-Back Versus Back-To-Front Lenses

Overlapping lenses composes their operators in either a front-to-back or a back-to-front order. Whether the composition order of a lens is front-to-back or back-to-front determines when the under-list of a lens is frozen. Controlling when lenses are frozen determines the composition order of a scene. While most operators of lenses compose back-to-front (i.e., the operator in the back of the overlap order is applied first), other operators of lenses more naturally compose front-to-back. As a general rule, lenses that add, delete, or reposition scene objects more naturally compose front-to-back, while all other lenses more naturally compose back-to-front. An example illustrating these two different methods for composing a scene is described below.

FIG. 18 illustrates a non-composed scene 1800 which includes a background shape 1801 and four other shapes indicated by reference numbers 1802, 1804, 1806, and 1808. The shapes shown in FIG. 18 overlap in the order given by their reference number (i.e. lowest ordered reference number is the first shape drawn). The shapes 1806 and 1808 are the only shapes in FIG. 18 defined as lenses. Specifically, the shape 1806, which is a red (indicated by a vertical fill pattern) gem-like shape, has the properties of a lens that tints objects seen through it red. The shape 1808, which is a clear rectangular shape, has the effect of scaling objects around their own centers that are positioned underneath it. In FIG. 18, the rectangular lens 1808 is a lens that scales the three objects 1802, 1804, and 1806 around their centers, thereby causing the three objects to overlap within the bounded area of the lens 1808 when composed as shown in FIG. 20.

FIG. 19 illustrates a scene list 1900 of the shapes in the non-composed scene 1800. The shapes in the scene list 1900 layered in back-to-front order as illustrated by an arrow indicated by reference number 1902. As shown in the scene list 1900, the shapes 1802 and 1804 are simple shapes, whereas the shapes 1806 and 1808 are shapes that are defined as lenses. However, unlike the example scene list 400 illustrated in FIG. 4, the scene list 1900 includes a magnifying lens 1808 that composes in front-to-back order. To correctly compose the scene 2000 with front-to-back lens 1808 requires that the scaling operation of the lens 1808 be performed before the tinting operation of the lens 1806 when shape 1808 is drawn.

FIG. 20 illustrates a composed scene 2000 of the scene list 1900. The scene 2000 includes two overlapping areas 2002 and 2004 which are tinted by tinting lens 1806. The composed scene 2000 is formed by first drawing the background rectangle 1801. Subsequently, the shapes indicated by reference numbers 1802 and 1804 are draw. To draw the lens 1806 requires the creation of an under-list 2100 shown in FIG. 21. Since there are no lenses in the under-list 2100, none of the shapes in the under-list 2100 are frozen. In addition, since the lens 1806 is a back-to-front style lens, freeze step 644 is performed followed by modify step 645 shown in FIG. 6D. Performing freeze step 644 requires that the lens shapes in the under-list 2100 are frozen at step 642. Subsequently to perform modify step 645, the lens function of the lens 1806 is applied to all the elements layered thereunder as shown in FIG. 22 to form a lensified-shape-list 2200, at step 643. Since the clipping region is set equal to the size of the shape 1806, the tinting that is imposed on any other shape in the scene 2000 (e.g., shapes 1802 and 1804) is not visible.

Figure 24:
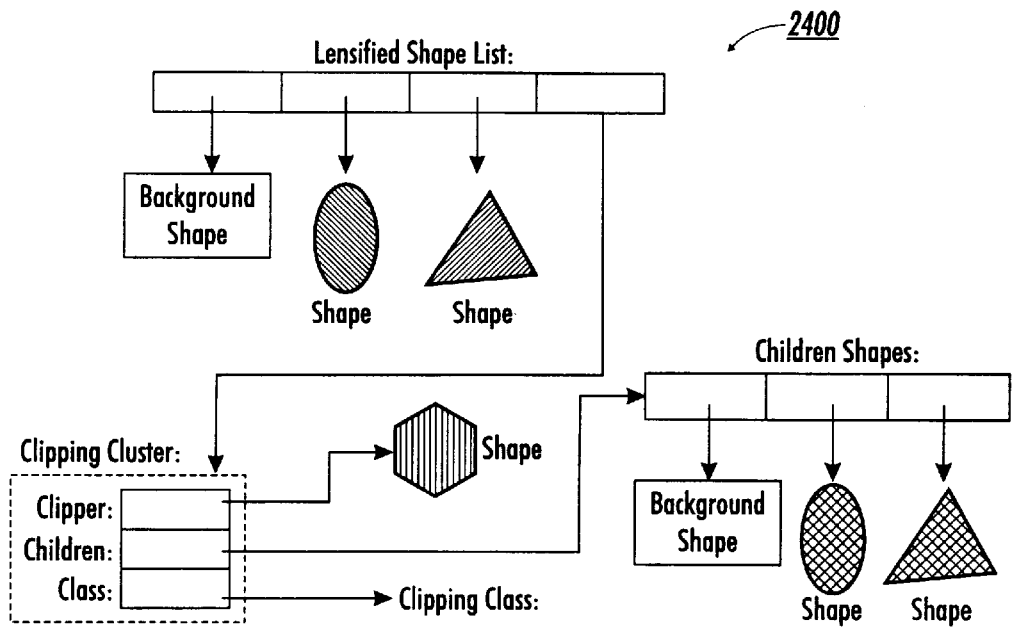
FIG. 24 illustrates the lensified shape list of the rectangular lens.

After drawing the tinting lens 1806, the magnifying lens 1808 is drawn. FIG. 23 illustrates an under-list 2300 computed for the magnifying lens 1808. Because the composition order of the lens 1808 is front-to-back, modify step 646 is performed followed by freeze step 647 in FIG. 6D. Modify step 646 requires that the lens function of the current lens 1808 is applied to those copied shapes layered under the current lens 1808. Subsequently, freeze step 647 is performed which freezes all of the lenses under the current lens 1808. In performing modify step 646, each of the shapes in the scene list 1900 are magnified in accordance with the specifications of the function of lens 1808. Upon completing modify step 646, each of the shapes under the lens 1808 are magnified, including the shape of the lens 1806. After modify step 646, freeze step 647 is performed which freezes all of the shapes under the current lens 1808. This freezing step transforms the lens 1806 into a clipping cluster 2402 in the resulting lensified shape list 2400 shown in FIG. 24. Because lens 1806 is layered above the shapes 1804 and 1802 in the scene list 1900, the tinting function is applied to each of the enlarged shapes 1802 and 1804 to define the tinted regions 2002 and 2004 shown in FIG. 20.

Figure 25:
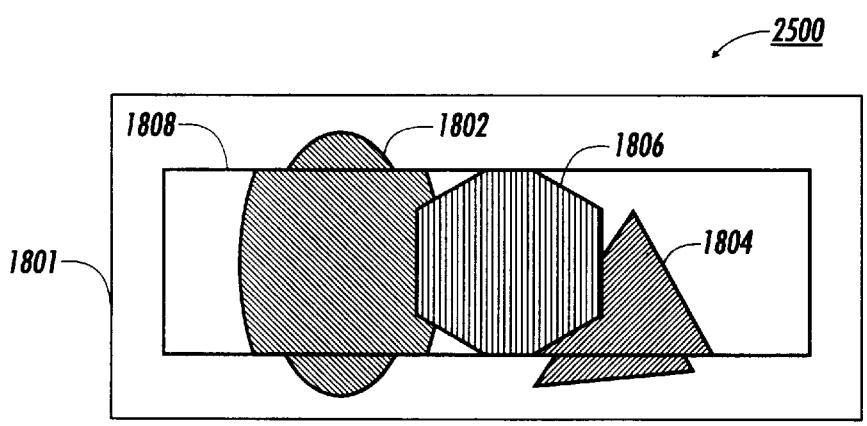
FIG. 25 illustrates a composed scene of the non-composed scene shown in FIG. 18 when the rectangular magnifying lens is composed in back-to-front order.

FIG. 25 illustrates the scene 2000 shown in FIG. 20 when the magnifying lens 1808 shown in FIG. 18 composes a scene 2500 in a back-to-front order. As set forth in FIG. 6D when the composition order of a lens is back-to-front, shapes in an under-list of a lens are frozen at step 642 before applying the function of the lens to the shapes in the under-list at step 643. When a lens is frozen before the shapes under the lens are modified, the tinting operation is performed before the scaling operation in the scene 1800 shown in FIG. 18. As a result, the tinted regions 2002 and 2004 shown in FIG. 20 are not formed when magnifying lens 1808 is composed in back-to-front order as shown in the scene 2500.

G. Limiting The Scope of Operation of A Lens

The following section pertains to minimizing the scope of operation of a lens to reduce the computational complexity in composing a scene with lenses and to achieve additional visual effects. The scope of operation of a lens includes those portions of a scene to which a lens applies. Whenever a user adds a lens to an illustration, the number of shapes in the final image potentially doubles because each shape under a lens is copied when an image is composed. Every shape that was previously in a scene may now appear both in its original form outside of the lens and in its modified form inside the lens (see steps 625–639 in FIG. 6C). As a result, the complexity of an image representing a scene may increase as much as $2^n$ (or exponentially), where "n" is the number of lenses in a scene. This complexity can be reduced by identifying those shapes in a scene that are layered below a particular lens but are not operated on by the lens. That is, the number of operations required for composing a scene can be reduced by minimizing the scope of operation of a lens in the scene. Minimizing the scope of operation of a lens limits the number of shapes in a scene that can be operated on by the lens. A first and a second method for limiting the scope of operation of a lens are discussed in sections G.1 and G.2, respectively.

G.1 User-Defined Scoping

Figure 26:
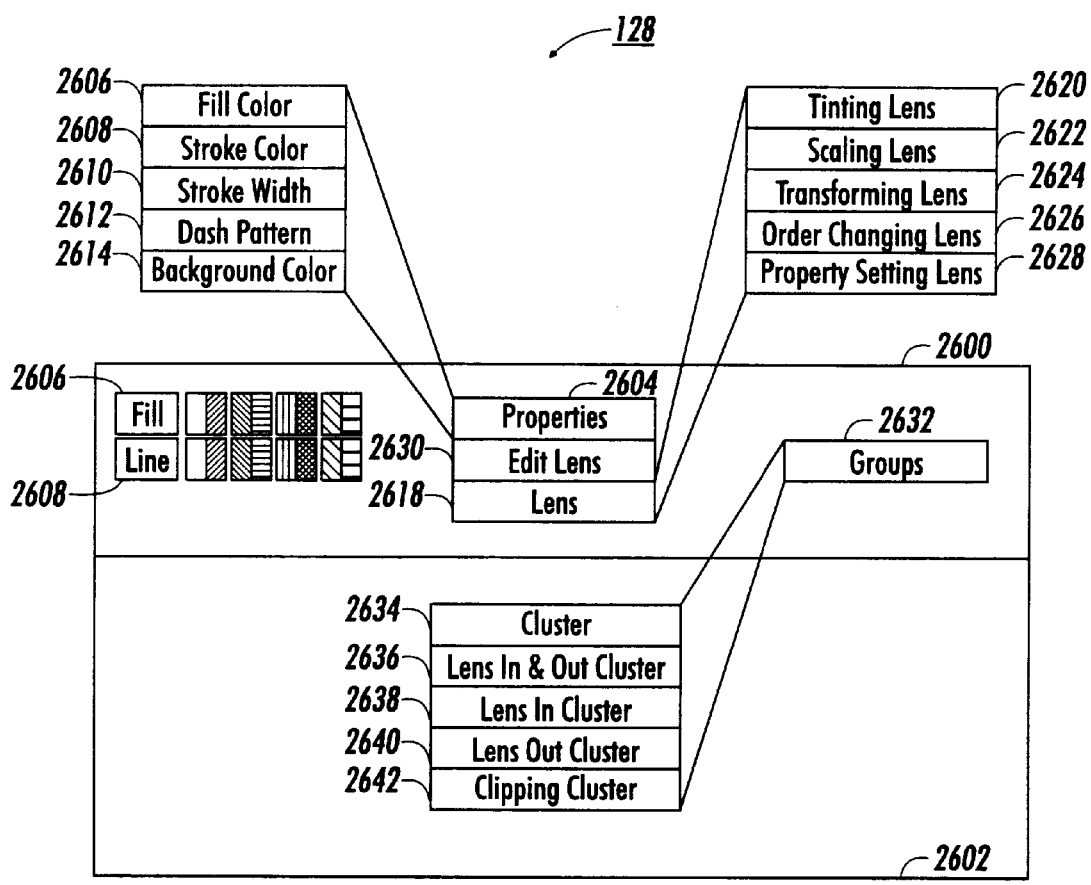
FIG. 26 illustrates an example of the user interface tool 128 shown in FIG. 1.

FIG. 26 illustrates an example of the user interface tool 128 shown in FIG. 1. The user interface tool 128 shown in FIG. 26 includes a command area 2600 and a scene development area 2602. Generally, a user employing one of the input devices 119 (shown in FIG. 1) selects commands in command area 2600 to develop shapes in the development area 2602. The shapes used to developed a scene in scene development area 2602 can include enclosed outline, lines, and text. Once a shape is defined its properties are set using the property menu 2604. Some of the properties that can be set and which are shown in the properties menu 2604 include, fill color 2606, stroke color 2608, stoke width 2610, dash pattern 2612, and background color 2614.

To specify one of the shapes developed in scene development area 2602 to be a lens, a user first selects a shape or shapes and then selects a lens type from a menu of lens types 2618. The menu of lenses includes a tinting lens 2620, a scaling lens 2622, a transformation lens 2624, an order changing lens 2626, and a property setting lens 2628. After selecting a type of lens from the menu of lens types 2618, the user can enter a system wide "EditLens" mode by selecting an Edit Lens menu button 2630. Once in the Edit Lens mode, a user can select properties from the property menu 2604. Any property selected at this point becomes a property that applies to objects underlying the lens. For example, if a user selects a tinting lens from the menu of lens types 2618 and enters the system wide "EditLens" mode, the user can subsequently select a fill color 2606 from the property menu to define the tinting color of the lens.

A further menu available to a user on user interface tool 128 shown in FIG. 26 is a group menu 2632. The group menu includes a cluster command 2634, a lens in & out cluster command 2636, a lens-in cluster command 2638, a lens-out cluster command 2640, and a clipping cluster command 2642, the details of which are discussed below. It will be understood by those skilled in the art that the number of elements shown in each menu 2604, 2618, and 2632 in FIG. 26 does not include all possible elements but instead are presented for illustrative purposes only.

A first method for limiting the scope of operation of a lens allows a user to combine several non-overlapping lenses into a single lens with multiple disjoint regions. Composition of the scene is simplified because a single lens with multiple regions is processed in the same fashion as a lens with a single region. By creating a single lens with multiple regions, the need to compose each region of the lens individually is eliminated. This first method for improving system performance reduces the complexity of composing a scene from $O(2^n)$ (exponential) to $O(1)$ (a constant), where n is the number of lens regions.

Figure 27:
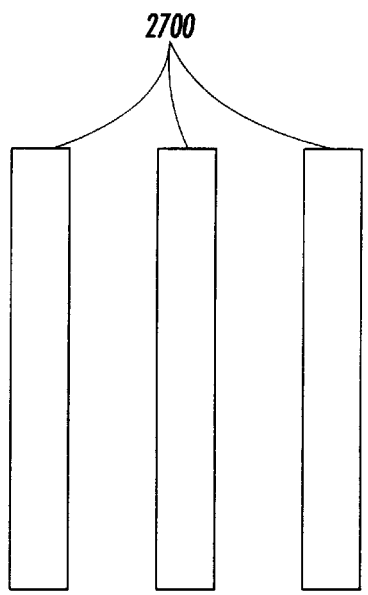
FIG. 27 illustrates a lens with multiple regions and a limited scope of operation.
Figure 28:
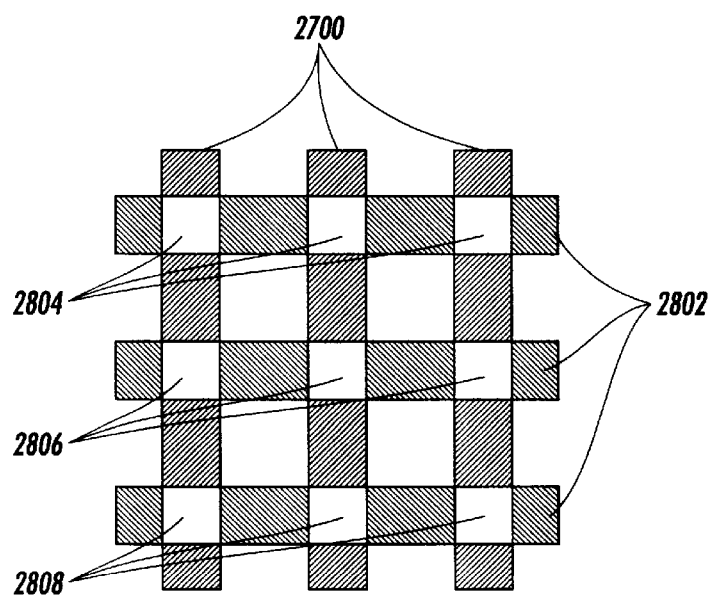
FIG. 28 illustrates an example using the lens shown in FIG. 27 to form a checkerboard pattern.

FIGS. 27 and 28 illustrate the first method for limiting the scope of a lens. The first method permits a user to create a tinting lens 2700 that consists of three rectangles. The three vertical rectangles 2700, shown in FIG. 27, are specified to be a single lens with multiple regions to minimize the scope of operation of what could have been three separate lenses. FIG. 28 illustrates how the lens 2700 composes when it is layered on top of a set of three horizontal rectangles 2802. Specifically, the overlapping regions 2804, 2806, and 2808 between the horizontal rectangles and the lens 2700 are tinted according to a specified tint, which is shown in FIG. 27 using different fill pattern. If the scope of operation of the lens 2700 was not limited by specifying a single lens, composition of the scene shown in FIG. 28 would have required the three horizontal rectangles to be copied as many times as the background rectangle 302 was copied in the example illustrated above in FIGS. 4, 5, and 9–17 instead of once (namely 8 or 23).

A second method for limiting the scope of operation of a lens allows a lo user to define lens clusters that have one of three different scoping operations. Using the group menu 2632 a user can select one of a plurality of clustering options. The cluster option 2634 enables a user to group several shapes as a single unit. Operations can then be specified on the single unit as a whole. The clipping cluster option 2642 creates a single unit but also clips the shapes making up the single unit to the outline of the last shape, followed by drawing the border pattern of the last shape. These clustering options apply to shapes whether they are specified to be lenses or not. The group 2632 menu items 2636, 2638, and 2640 only apply to a grouping of shapes that include at least one lens.

Figure 29:
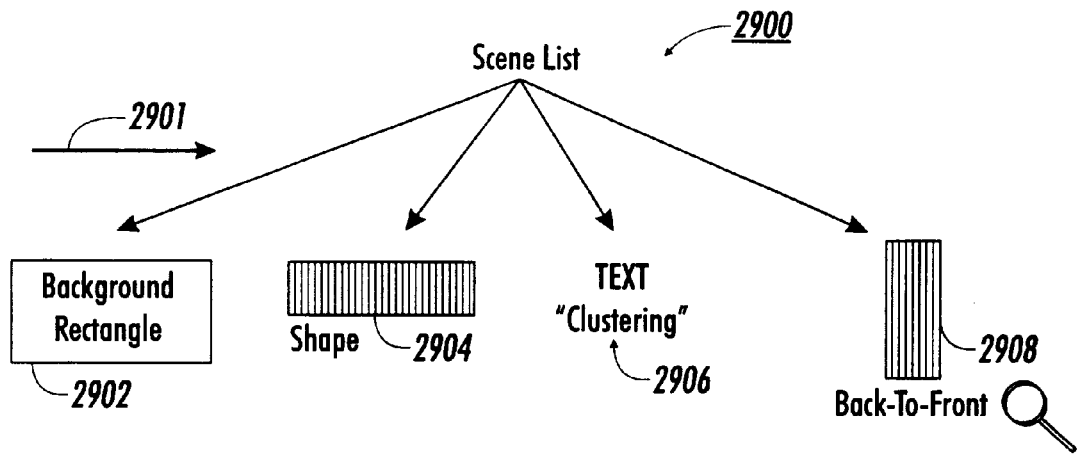
FIG. 29 illustrates a scene list for forming the image shown in FIGS. 31 and 32.

The group 2632 menu items lens-in-cluster 2638 and lens-out-cluster 2640 limit the scope of a grouping of shapes in two different ways. The lens-in-&-out-cluster 2636 create a grouping of shapes where the scoping rules for both the lens-in-cluster 2638 and the lens-out-cluster 2640 apply. The lens-in-cluster menu item 2638 reduces the scope of operation of any lens in a cluster of shapes by only applying the filtering function of each lens in the cluster to those shapes ordered below it that are inside the cluster. In contrast, the lens-out-cluster menu item 2640 reduces the scope of operation of any lens in a cluster of shapes by only applying the filtering function of each lens in the cluster to those shapes ordered below it that are outside the cluster. FIGS. 29–32 illustrate the manner in which a lens 2908 in a scene can have a limited scope of operation on the shapes layered below it by clustering the lens with other shapes in the scene. FIG. 29 illustrates a scene list 2900 for the scene of shapes. The shapes in the scene list 2900 are layered from back-to-front as indicated by arrow 2901. Specifically, the scene list 2900 includes a background rectangle 2902, a rectangular shape 2904, a text object 2906 setting forth the word "Clustering", and a back-to-front lens 2908. The lens 2908 is specified to be a property setting lens 2628 using user interface tool 128 (shown in FIG. 26). A property setting lens may change the fill color of shapes layered below the lens as well as the background color of the background rectangle layered below the lens among other properties. The fill color and the background color properties are set by selecting fill color 2606 and background color 2614 from the property menu 2604, respectively.

Figure 30:
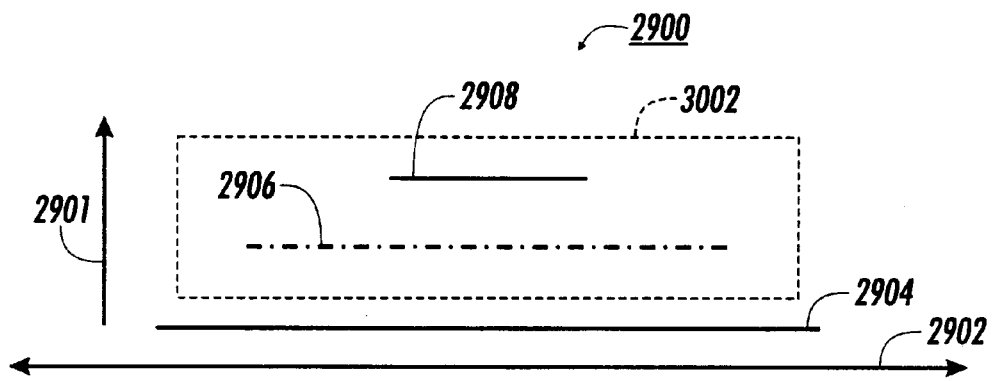
FIG. 30 illustrates the scene list shown in FIG. 29 as seen along view line 30—30 in the images shown in FIGS. 31 and 32.
Figure 31:
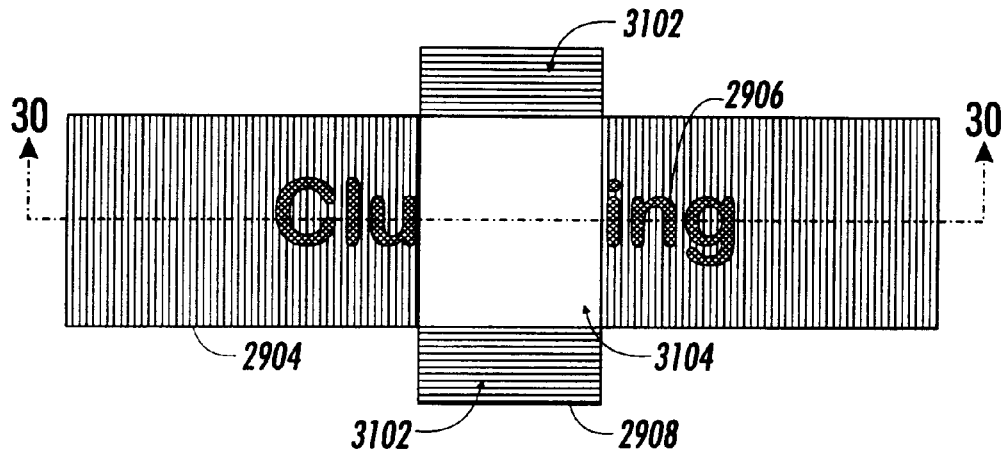
FIG. 31 illustrates the manner in which the scene list shown in FIGS. 29 and 30 composes with a lens in & out cluster.
Figure 32:
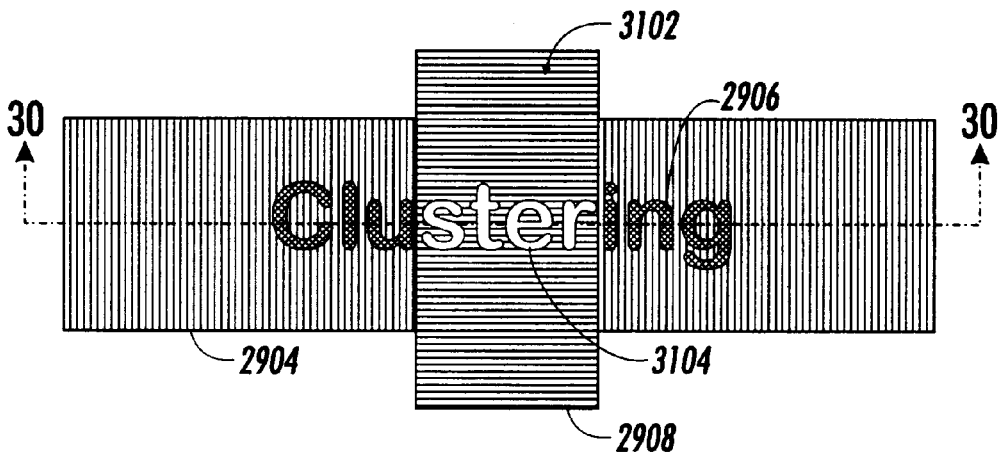
FIG. 32 illustrates the manner in which the scene list shown in FIGS. 29 and 30 composes with a lens-in cluster.

FIG. 30 illustrates the scene list 2900 layered in back-to-front direction 2901. Unlike FIG. 29 which illustrates the shapes of the scene ordered in a tree, FIG. 30 illustrates each of the shapes in the scene list 2900 as they appear layered over each other. In addition, FIG. 30 illustrates a lens cluster 3002. Shapes identified to be in the lens cluster 3002 include the text object 2906 and the lens 2908. As set forth above, three different types of lens clusters are selectable from the groups menu 2632. FIGS. 31 and 32 illustrate the scene list 2900 shown in FIG. 30 composed as a lens in & out cluster 2636 and as a lens-in cluster 2638, respectively, as seen along view line 30—30. In FIGS. 31 and 32, the lens 2908 composes with two different textures: a clear texture which is identified by reference number 3104; and a horizontal stripe pattern which is identified by reference number 3102. The clear texture 3104 identifies those areas where the lens 2908 modified the fill color of objects layered under the lens in the scene. The horizontal striped pattern 3102 identifies those areas where the lens 2908 modified the background color of the scene.

More specifically, FIG. 31 illustrates how the scene list 2900 composes when cluster 3002 acts as a lens in & out cluster 2636 which is selectable under the group item menu 2632. As set forth above, the scope of operation of a lens is not limited when a lens is composed as lens in & out cluster 2636. When the scene list 2900 composes the lens 2908 operates on both the text object 2906 and the rectangular shape 2904, since a lens in & out cluster operates on shapes both inside and outside the cluster 3002. Consequently, the fill color of the portions of the text object 2906 and the rectangular shape 2904 positioned under the lens are modified in accordance with the fill color specified by the lens 2908. Those portions of the lens only exposed to the background rectangle 2902 are modified in accordance with the background color specified by the lens 2908.

Unlike FIG. 31, FIG. 32 illustrates the instance where the cluster 3002 acts as as a lens-in cluster 2638. As set forth above, a lens-in cluster 2638 modifies only those shapes within the cluster 3002. In the scene shown in FIG. 29, this causes the lens 2908 to only operate on the text object 2906, thereby causing the effect shown in FIG. 32 instead of FIG. 31. When composing the scene list 2900, the background color (horizontal stripped pattern 3102) is applied to those areas under the lens which do not have any shapes. Again, when the fill color specified by the lens 2908 is applied to those shapes directly under the lens, rectangular shape 2904 is ignored because the cluster 3002 is a lens-in cluster 2638. Consequently, the clear fill color 3104 is only applied to text object 2906, thereby affecting only the "ster" portion of the word "clustering".

Figure 33:
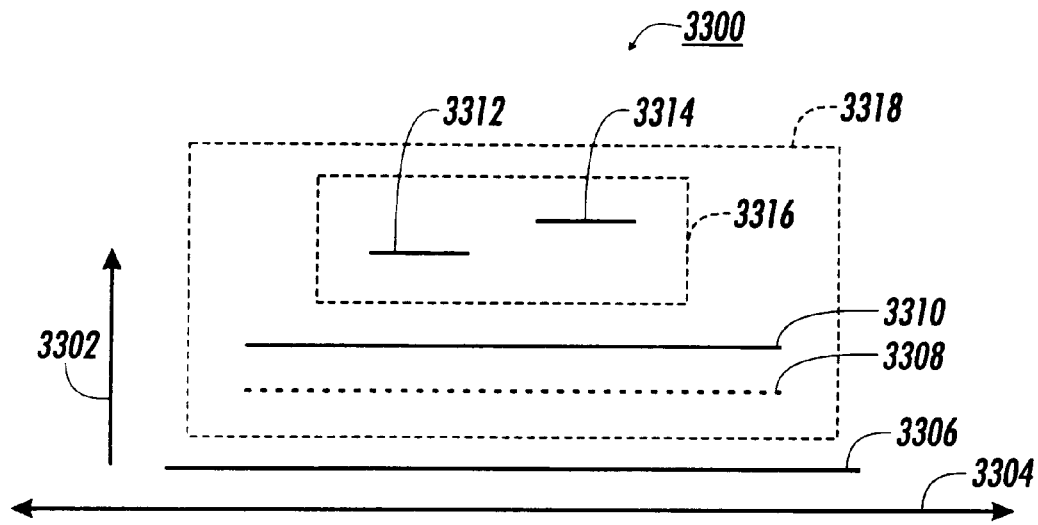
FIG. 33 illustrates a scene list in which a lens-in cluster and a lens-out cluster is specified.
Figure 34:
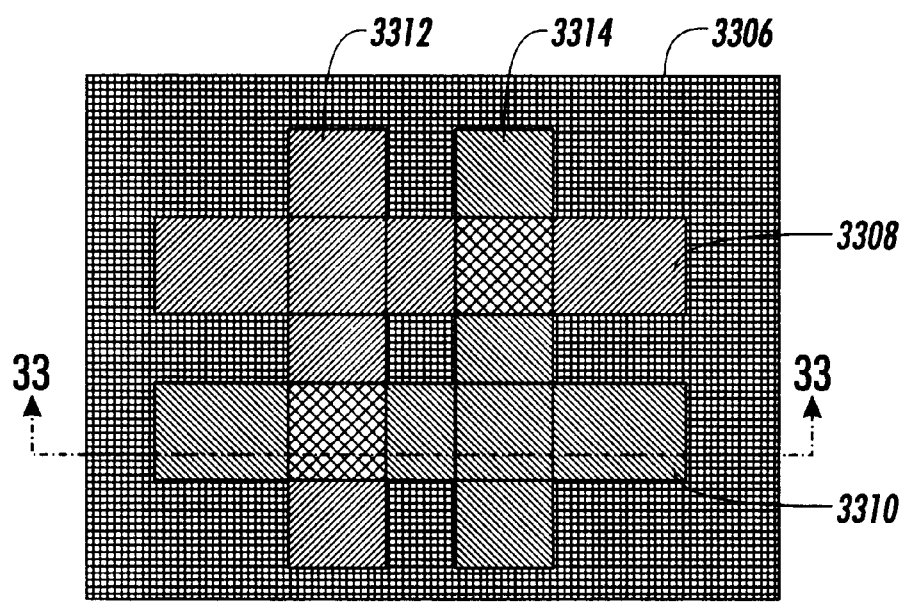
FIG. 34 illustrates a composed image of the scene list shown in FIG. 33 and seen along view line 33—33.

FIGS. 33 and 34 illustrate another example of lens clustering to minimize the scope of operation of a lens. FIG. 34 illustrates a scene list 3300 composed as seen along view line 33—33 in FIG. 33. FIG. 33 illustrates the scene list 3300 ordered in back-to-front order in the direction of arrow 3302.

The shapes that make up the scene 3300 include a background rectangle 3304 with white fill, a rectangle 3306 with a checkered pattern fill, a first horizontal rectangle 3308 with left slanting fill lines, a second horizontal rectangle 3310 with right slanting fill lines, a first lens 3312, and a second lens 3314. The first lens 3312 has a left slanting fill color and the second lens 3314 has a right slanting fill color.

As shown in FIG. 33, the first property setting lens 3312 and the second property setting lens 3314 are grouped into a lens-out cluster 3316. As defined above, a lens forming part of a lens-out cluster does not take into account those shapes in a scene list that are layered below it in that cluster when a scene is composed. The purpose of the lens-out cluster is to minimize the scope of operation of each lens. More specifically when the scene 3300 composes, because of the lens-out cluster 3316, the second property setting lens 3314 does not add the first property setting lens 3312 to its under-list. As a result, when the under-list of property setting lens 3314 is frozen, the under-list of first filtering lens 3312 does not have to be frozen. This makes the final composition and rendering of the scene-list 3300 more computationally efficient.

In addition, the first property setting lens 3312, the second property setting lens 3314, the first horizontal rectangle 3308, and the second horizontal rectangle 3310 are grouped into a lens-in cluster 3318. As set forth above a lens forming part of a lens-in cluster takes into account only those shapes inside the cluster and layered below it when the scene is composed. Thus, when the lenses 3312 and 3314 compose, the rectangle 3306 is not included as a shape in the under-list of either lens. This causes the scene list 3300 to compose as shown in FIG. 34 with the lenses 3312 and 3314 tinting the portions that only overlap the rectangle 3306 with the background color of each lens.

G.2 Bounding Box Culling

In addition to user-defined scoping set forth above, illustration program 122 can perform bounding box culling to minimize the scope of operation of a lens. Generally, when a lens computes its interior appearance at a given point in time, it does not always have to process all of the shapes ordered under it in the scene list. Instead, the appearance of the interior of a lens can be computed with only those shapes in the scene list that contribute to its appearance. In many cases, the illustration program 122 can attempt to rule out some shapes that do not influence the appearance of the interior of a lens. This can greatly improve to rendering performance when a scene is composed, particularly if some of the shapes that are ruled out are themselves lenses.

It is important to note that the set of shapes that is visible through the lens, is not necessarily limited to the shapes that are directly under the lens. For example, a translation lens may show some shapes that are to the side of the lens. Likewise a lens that shrinks objects (scale factor less than 1.0) may bring in some or all of the entire picture. As a result, bounding box culling can be performed in at least three different cases by the illustration program 122 to automatically remove shapes from the scope of operation of a lens when the lens is composed.

In a first case of lenses that neither transform nor change shapes, the illustration program 122 removes from consideration during composition of the lens all shapes that lie entirely outside the bounding rectangle (or region) of the lens. In a second case of lenses that perform an affine transformation (translation, rotation, scaling, or skewing) on all shapes as a group, the illustration program 122 applies the inverse of the affine transformation to the shapes in the scene-list under the lens. The bounding rectangle of the resulting shape is then used to limit the scope of operation of the lens as set forth in the first case above. In a third case of lenses that add, delete, or change shapes, the illustration program 122 has a unique procedure for computing a culling box for each lens. For example, a lens that adds drop shadows under all shapes should show each drop shadow that appears under the lens, even if the shape that generates the drop shadow is not itself under the lens. This can be accomplished by beginning with the bounding box of the drop shadow lens and then augmenting it by the inverse of the drop shadow displacement.

H. Caching

A scene-list is re-drawn each time a user either repositions a lens in the scene or repositions the shapes under a lens in the scene. In certain situations, the composed scene does not change in all locations each time the scene is drawn. In these situations, it is possible to reuse the output from some of the computations that were performed the previous time the scene was drawn. The illustration program 122 reuses prior output by saving the composed scene produced by each lens together with a summary of the inputs of the non-composed scene in memory 112 (shown in FIG. 1).

Caching can often be used even if a lens has moved within a scene. For example, if a tinting lens has moved since it was last drawn, but is still over the same objects (and these objects are unchanged), then its composed scene (tinted versions of these objects) is unchanged. Only the clipping region to be applied to the shapes in the scene has changed. Hence, the previous result of the scene-from-scene procedure set forth in Table 5 can be used instead of computing a new one.

Generally, the illustration program 122 takes the type of lens into account and decides on a lens by lens basis whether caching should be used for a given lens. In the case of a lens that performs affine transformations, such as a magnification lens, the previous scene can be used so long as it is translated based on a new position of the origin (center of scaling or rotation). In contrast, some lenses must be recomposed whenever they move. For example, a lens that distorts shapes non-linearly produces a different output at each position. In one instance, caching is performed by storing each frozen shape in the memory 112 together with a description of the inputs (or parameters) that produced the frozen shape.

The accuracy of caching is maintained by determining when the inputs to a lens (i.e., the parameters that define a lens) are the same as previous inputs (i.e., parameters). To insure the accuracy of caching, the illustration program 122 updates a time stamp of shapes in a scene every time any edit is made. The time stamp of a shape indicates the last time a shape was edited by a user.

In one embodiment, it is assumed that user actions such as dragging and rubberbanding are not counted as edits until they complete. Using this assumption, a coarse version of caching can be performed by associating the scene-wide time stamp on the non-composed scene with the cached lens output. If the time stamp of the scene has not changed since the lens last computed its output, the lens parameters have not changed, and the type of lens is compatible with caching, then the cached scene can be used.

In an alternate embodiment, a more aggressive caching scheme is used which time stamps each object in the scene. In this alternate embodiment, so long as no time stamps from shapes under the lens change, the cached scene can be used.

I. Conclusion

To recapitulate, the present invention concerns a computerized two-dimensional illustration system for composing layered synthetic graphics filters or lenses as components of a scene. In such illustration systems, users construct scenes by layering bounded geometrical shapes and specifying graphical properties such as line width, fill color, and transparency. In most circumstances, the graphical properties of bounded geometrical shapes can only be applied to entire shapes. To achieve visual effects that cross apparent shape boundaries, a user typically has to introduce extra shapes or boundaries into a scene. A lens, however, changes the appearance of shapes seen through its interior bounded region, so the spatial extent of the effect is independent of the boundaries of those shapes. Advantageously, lenses layered in a scene can be composed to create a wide range of spatially-bounded visual effects, that include the appearance of tinted glass, optical lenses, water, glow, weaving, shadows, x-rays, plaids, and three-dimensional depth.

The system for composing layered synthetic graphics filters may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized. The system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for composing an image with a computer illustration system, comprising the steps of:
    defining a list of shapes in a memory;
    specifying each of a plurality of shapes in the list of shapes to be a lens with a filtering function that applies to at least one other shape in the list of shapes;
    assigning a composition order to each lens specified in the list of shapes to have one of a front-to-back ordering and a back-to-front ordering; said assigning step assigning at least one of the lenses to have a front-to-back ordering and at least another of the lenses to have a back-to-front ordering; and
    forming each shape in the list of shapes to compose the image.

2. The method according to claim 1, wherein said specifying step specifies the filtering function to be one of a scaling function and a tinting function.

3. The method according to claim 1, further comprising the step of limiting the scope of operation of a selected lens in the list of shapes to exclude at least one of the shapes in the list of shapes from being modified by the filtering function of the selected lens.

4. The method according to claim 3, further comprising the step of defining a cluster of shapes that includes the selected lens and at least one other shape in the list of shapes.

5. The method according to claim 4, wherein said limiting step limits the scope of operation of the selected lens by excluding those shapes outside the cluster of shapes from being modified by the filtering function of the lens.

6. The method according to claim 4, wherein said limiting step limits the scope of operation of the selected lens by excluding those shapes inside the cluster of shapes from being modified by the filtering function of the lens.

7. The method according to claim 3, wherein said limiting step further comprises the step of combining several non-overlapping lenses into a single lens with multiple regions.

8. The method according to claim 1, wherein said forming step forms each lens in the list of shapes by:
    computing an under-list of shapes for the selected lens; the under-list of shapes identifying shapes in the list of shapes to which the filtering function of the selected lens may apply;
    freezing any shape specified to be a lens in the under-list of shapes by replacing each lens with shapes that are formed independently of other shapes; and
    applying the filtering function of the selected lens to each shape in the under-list of shapes.

9. The method according to claim 8, wherein said freezing step is performed before said applying step when the composition order of a lens is assigned a back-to-front ordering.

10. The method according to claim 8, wherein said applying step is performed before said freezing step when the composition order of a lens is assigned a front-to-back ordering.

11. The method according to claim 8, further comprising the step of copying each shape in the under-list before said freezing step and said applying step are performed.

12. A computer illustration system for composing an image, comprising:
    a memory for storing a list of shapes;
    means for specifying each of a plurality of shapes in the list of shapes to be a lens with a filtering function that applies to at least one other shape in the list of shapes;
    means for assigning a composition order to each lens specified in the list of shapes to have one of a front-to-back ordering and a back-to-front ordering; said assigning means assigning at least one of the lenses to have a front-to-back ordering and at least another of the lenses to have a back-to-front ordering; and
    processing means for forming each shape in the list of shapes to compose the image.

13. The computer illustration system according to claim 12, wherein said processing means composing a selected lens specified in the list of shapes by:
    computing an under-list of shapes for the selected lens; the under-list of shapes identifying shapes in the list of shapes to which the filtering function of the selected lens may apply;
    freezing each lens in the under-list of shapes by replacing each lens with shapes that are formed independently of other shapes in the list of shapes; and
    applying the filtering function of the selected lens to each shape in the under-list of shapes.

14. The computer illustration system according to claim 13, wherein said processing means freezes each lens in the under-list of shapes before applying the filtering function of the selected lens to each shape in the under-list of shapes.

15. The computer illustration system according to claim 13, wherein said processing means applies the filtering function of the selected lens to each shape in the under-list of shapes before freezing each lens in the under-list of shapes.

16. The computer illustration system according to claim 13, further comprising means for copying each shape in the under-list before freezing each lens in the under-list of shapes and applying the filtering function of the selected lens to each shape in the under-list of shapes.

17. The computer illustration system according to claim 12, wherein said processor limits the scope of operation of the lens of the first object to exclude at least one of the shapes layered below the lens from being modified by the filtering function of the lens.

18. The computer illustration system according to claim 17, wherein said processor defines a cluster of shapes that includes the lens in the list of shapes and selected shapes in the list of shapes layered below the lens.

19. The computer illustration system according to claim 18, wherein said processor limits the scope of operation of the lens by excluding those shapes outside the cluster of shapes from being modified by the filtering function of the lens.

20. The computer illustration system according to claim 18, wherein said processor limits the scope of operation of the lens by excluding those shapes inside the cluster of shapes from being modified by the filtering function of the lens.

21. The computer illustration system according to claim 18, wherein said processor further comprises means for combining several non-overlapping lenses into a single lens with multiple regions.

* * * * *